US012138570B2

(12) United States Patent
Gannon et al.

(10) Patent No.: US 12,138,570 B2
(45) Date of Patent: Nov. 12, 2024

(54) FILTER MEDIA INSERT STRUCTURES AND METHODS OF INSTALLATION

(71) Applicant: Solidification Products International, Inc., Northford, CT (US)

(72) Inventors: William J. Gannon, Northford, CT (US); Paul Melaccio, Clinton, CT (US)

(73) Assignee: SOLIDIFICATION PRODUCTS INTERNATIONAL, INC., Northford, CT (US)

( * ) Notice: Subject to any disclaimer, the term of this patent is extended or adjusted under 35 U.S.C. 154(b) by 41 days.

(21) Appl. No.: 17/708,583

(22) Filed: Mar. 30, 2022

(65) Prior Publication Data
US 2022/0249991 A1    Aug. 11, 2022

Related U.S. Application Data

(62) Division of application No. 16/913,554, filed on Jun. 26, 2020, now Pat. No. 11,325,062.
(Continued)

(51) Int. Cl.
*B01D 35/30* (2006.01)
*B01D 17/02* (2006.01)
(Continued)

(52) U.S. Cl.
CPC ....... *B01D 35/306* (2013.01); *B01D 17/0202* (2013.01); *B01D 35/301* (2013.01);
(Continued)

(58) Field of Classification Search
CPC ......... B01D 35/306; E03F 5/0404; E03F 5/06
See application file for complete search history.

(56) References Cited

U.S. PATENT DOCUMENTS 2,657,805 A    11/1953   Palcer
5,223,154 A    6/1993   MacPherson, Jr. et al.
(Continued)

FOREIGN PATENT DOCUMENTS

WO    WO9945214 A1    9/1999

OTHER PUBLICATIONS

European Search Report dated May 22, 2023 in the Related European Patent Application.

*Primary Examiner* — Benjamin M Kurtz
(74) *Attorney, Agent, or Firm* — DeLio Peterson & Curcio LLC; Robert Curcio

(57) ABSTRACT

Structures for housing a filtration media for the removal and/or solidifying of synthetic ester-based fluids from liquids are provided. The structures disclosed include: a stormwater insert container for installation within a storm drain designed for intake of high volumes of water; an angling filter plug mounting structure and pre-filter basket for a flush installation on a planar floor, such that the filtration media rests beneath the floor and releases filtered liquids into a drainage area; a trench filtration assembly for installation into a trench below surface level, such that the unfiltered liquid passes through the trench and a trench box disposed within the trench filtration assembly prior to passing through the filtration media into a drainage area; and a liner box assembly for installation over an opening made in a non-permeable liner for purposes of pre-filtering contaminated liquids as it flows through the liner box and subsequently the filtration media.

11 Claims, 22 Drawing Sheets

Related U.S. Application Data

(60) Provisional application No. 62/866,935, filed on Jun. 26, 2019.

(51) Int. Cl.
*E03F 5/04* (2006.01)
*E03F 5/14* (2006.01)

(52) U.S. Cl.
CPC ........ *B01D 2201/307* (2013.01); *E03F 5/041* (2013.01); *E03F 5/14* (2013.01)

(56) References Cited

U.S. PATENT DOCUMENTS

| | | | |
|---|---|---|---|
| 5,733,445 A | 3/1998 | Fanelli | |
| 5,958,226 A | 9/1999 | Fleischmann | |
| 6,214,217 B1 | 4/2001 | Sliger, Jr. | |
| 6,485,639 B1 | 11/2002 | Gannon | |
| 6,841,077 B2 | 1/2005 | Gannon | |
| 7,524,414 B1 * | 4/2009 | Barragan | E03F 1/00 210/170.03 |
| 9,646,735 B2 | 5/2017 | Adamson | |
| 2003/0141230 A1 * | 7/2003 | Mokrzycki | E03F 5/16 210/163 |
| 2004/0232057 A1 | 11/2004 | Orozco et al. | |
| 2004/0251185 A1 * | 12/2004 | Pitt | E03F 1/00 210/163 |
| 2006/0091049 A1 | 5/2006 | Hurst et al. | |
| 2009/0039022 A1 * | 2/2009 | Belasco | E03F 5/14 210/651 |
| 2010/0051524 A1 | 3/2010 | Marshall et al. | |
| 2013/0186811 A1 | 7/2013 | Kaiser | |

* cited by examiner

FILTER MEDIA INSERT STRUCTURES AND METHODS OF INSTALLATION

BACKGROUND OF THE INVENTION

1. Field of the Invention

The present invention relates to structures for receiving filtration medias for use in filtering debris, and removing and/or solidifying synthetic ester-based fluids from liquids, such that the resultant liquids may be free from such oils and solvents after filtering. More particularly, the present invention relates to filtration insert containers for holding a filtration media, and the methods of making, forming, and installing the same, for separating synthetic ester-based fluids, oil sheen, dirt, and other debris from liquid, which is useful, for example, in power plant and other industrial applications.

2. Description of Related Art

Today's escalation in power demands pushes often aging networks to their limits, causing unprecedentedly high failure rates in their technologies, such as catastrophic failures in large power transformers. In these situations, mineral-oil-based dielectric insulating fluids have demonstrated costly limitations. For instance, mineral-oil-filled transformer explosions and fires causing heavy collateral damage have raised major safety concerns. There have also been major environmental concerns over the toxic effects of uncontained mineral oil spills. This has given rise to a new class of alternative dielectric insulating fluids (ester oils) that have historically been developed to answer these specific concerns, but present unique problems of their own.

In order to prevent contamination of the environment by oils and solvents, in many commercial and industrial applications and installations, spill containment systems are built that not only trap the potential spilled liquids but also any process liquid or rain/snow-melt liquid that comes in contact with the spill containment area. Federal, State and local regulations that mandate spill protection to minimize or eliminate contaminated discharges to the environment require engagement at the spill site, such as the implementation of containment methods and systems.

One such example of a spill containment system is the implementation of storm drains typically found at truck stops. These drains are effective at redirecting high volumes of water away from the location, but in many instances, these high volumes of water contain oil sheen accumulated from the surrounding environment. Such oil sheen includes, but is not limited to, diesel, gasoline, hydrocarbon oils, transmission fluids, general fuels, or the like.

Another example includes drainage trenches disposed near loading docks at automotive based businesses including car dealerships. These trenches typically run along the door of the loading dock, or just outside of it. Water runoff (and gas/oil mixed in) is collected within these trenches. This water runoff feeds into a storm drain with little to no filtration applied beforehand.

As yet another example, present day power plants use natural and/or synthetic ester-based fluids (also referred to herein as "oil" or "fluid") to greatly improve electrical performance and cooling capabilities in their transformers. Ester-based fluids may also be used as lubricants, and as hydraulic fluids. The use of natural esters (which are typically oil based) at these plants presents the possibility of fluid spills occurring on-site, which presents a risk of environmental contamination. Natural esters may also be flammable or present poor biodegradable properties, among other issues. Synthetic ester-based fluids have thus been created in response to these issues that arise from the use of natural esters.

Synthetic base ester oil is oil that has been chemically synthesized. Typically, synthetic ester-based fluids are used in such applications as passenger car air-conditioning compressors, refrigerators, and transformers, and in other industrial applications. Synthetic esters are prized for their ability to lubricate at high temperatures. One of the main reasons for this is that they have a much lower volatility than other lubricant base oils at a given viscosity. Volatility is strongly related to smoke point, flash point, and fire point. Ester oils are generally utilized as a replacement for mineral oil in distribution and power class transformers.

Although these synthetic ester-based fluids are deemed to be non-hazardous and biodegradable, a formulation can include hundreds of additives, which address performance issues specific to their application and performance shortcomings of the base oil. Additives are commonly used to address oxidative aging, corrosion, high pressure, low or high temperature conditions, phase transition, shear, foaming, and hydrolysis (particularly for vegetable and synthetic ester-based oils). Consequently, the need exists for total synthetic ester-based fluid containment technology in the event that a failure occurs which requires immediate containment.

Generally, graphene has been utilized as a filler for composite materials due in part to its intrinsic mechanical, thermal, and electrical properties. For example, graphene's lack of solubility in substantially all solvents has led to the common practice of either using graphene oxide or reduced graphene oxide in lieu of pristine graphene sheets.

In U.S. Pat. No. 9,646,735 issued to Adamson, et al. on May 9, 2017, titled "GRAPHENE/GRAPHITE POLYMER COMPOSITE FOAM DERIVED FROM EMULSIONS STABILIZED BY GRAPHENE/GRAPHITE KINETIC TRAPPING," a graphene/graphite stabilized composite (e.g., graphene/graphite stabilized emulsion-templated foam composite) is used to make foam composites that have shown bulk conductivities up to about 2 S/m, as well as compressive moduli up to about 100 MPa and breaking strengths of over 1200 psi, with densities as low as about 0.25 g/cm$^3$.

The aforementioned graphene/graphite material may be formed as an adsorption/absorption media to achieve desirable results when exposed to natural esters (e.g. hydrocarbon oils); however, reaction to synthetic ester-based fluids is entirely unique due to high flash point properties and resistance to combustion/explosion.

Thus, although the graphene/graphite polymer composite foam of U.S. Pat. No. 9,646,735 is promising for potential application to natural esters, there are limitations and unique challenges to the application of this composite for applications requiring the containment of esters (natural and synthetic).

Problems regarding the installation and structure of filtration assemblies, and their ability to handle certain flows/volumes of fluid are present in the prior art. In one instance, stormwater drains are ill-equipped to handle the high volumes of fluid occasionally presented to them (e.g. during major rainstorms) in a manner that achieves proper filtration of sheen from such stormwater while simultaneously allowing the passage of filtered fluid at such high volume levels. These stormwater drains are structured either to simply allow full passage of contaminated fluids therethrough, or may present crude filtration capabilities, but are deficient as they cannot filter in speeds and efficiencies necessary to prevent buildup and resultant puddling on the surface above the drain.

In another instance, spill containment areas typically found in power plants and other such areas akin to regular exposure to oils, esters, and/or general sheen, present poor solutions when faced with the problem of drainage. Specifically, the prior art fails to properly address the issue of draining fluid buildup from the containment area in a manner that keeps the contamination within said area, and simultaneously allows the egress of filtered water from the same area. Many prior art solutions present filtration assemblies that are poorly structured, and are thus exposed to constant clogging from larger particles such as stone, dirt, trash, and other larger debris, resulting in largely ineffective filtration, or complete bypass of the assembly itself thereby rendering it ineffective.

SUMMARY OF THE INVENTION

Bearing in mind the problems and deficiencies of the prior art, it is therefore an object of the present invention to provide a filtration media insert box or container that allows for a steady flow rate of water and sealing in the presence of an overloaded supply of ester-based fluids, and predominantly synthetic ester-based fluids.

It is another object of the present invention to provide a stormwater insert box or filter container capable of filtering oil sheen from high volumes of rainwater introduced to the insert filter container over short periods of time.

It is yet another object of the present invention to provide a stormwater insert box or filter container and shutoff valve assembly capable of allowing a bypass flow of stormwater into a storm drain once the measured volume per unit of time exceeds an established threshold.

It is still a further object of the present invention to provide a method of installing a stormwater insert filter container into a storm drain at locations exposed to high volumes of fluid and/or oil sheen.

It is another object of the present invention to provide a stormwater insert filter container capable of accepting high volumes of water in a cavity below surface level, thus enabling any pooling fluids to gather below the surface and prevent pooling above the surface while such fluid is being filtered.

It is yet another object of the present invention to provide an angled filter insert assembly for a filter media plug for filtering ester-based fluid spills at energy plants in such a way that allows for easy drainage of the filtered water into a location outside of the affected area.

It is another object of the present invention to provide a drainage and filtration system that utilizes multiple angled filter insert assemblies to direct filtered fluids away from a containment area and towards a sump.

It is still another object of the present invention to provide a method of installing an angled filter insert assembly for a filter media plug at energy plants and other sites akin to constant dangers of ester/oil leakage.

It is yet another object of the present invention to provide a method of installing an angled filter insert assembly system that uses multiple filter insert assemblies and filter media plugs, which allows for the leading of filtered fluids into a collective container such as a sump.

It is a further object of the present invention to provide a trench filtration assembly for a filter media plug for filtering fluid runoff introduced into the trench.

Still another object of the present invention is to provide a method of installing a trench box into a water runoff trench at a loading dock or similar automotive-based locations.

Still a further object of the present invention is to provide numerous methods for removing and replacing the media within a trench box housing, and for further reattaching the trench box to said housing.

Another object of the present invention is to provide a pre-filter liner box assembly for filtering contaminated fluid collected within a non-permeable liner while simultaneously preventing clogs.

Yet another object of the present invention is to provide a method of installing a pre-filter liner box assembly within a non-permeable liner.

Still other objects and advantages of the invention will in part be obvious and will in part be apparent from the specification.

The above and other objects, which will be apparent to those skilled in the art, are achieved in the present invention which is directed to a stormwater filter container assembly. It comprises an insert filter container having a hollow internal structure, which is bounded by inside and outside surfaces with a filter media contained therein. Said inside surface forms a cavity. An insert filter container lip or flange encloses a top portion of said hollow internal structure. A mounting bracket has a mounting bracket flange for receiving the insert filter container lip or flange, and a cavity is disposed in the mounting bracket for receiving the insert filter container. The insert filter container is disposed within the mounting bracket such that the insert filter container is insertable within the mounting bracket cavity, and the insert filter container lip or flange is supported on the mounting bracket flange. The storm water flowing into the insert filter container cavity exits through the inside and outside surfaces while passing through the filtration media.

In an embodiment, the stormwater filter container assembly may further include a silicone gasket disposed between the mounting flange and insert filter container lip to create a fluid-tight seal between the mounting bracket and insert container. A grate may be disposed over the top surface of the insert filter container within the mounting bracket, and a pre-filter pad may be disposed over the top surface of the grate, also within the mounting bracket to provide additional filtration of entering stormwater. An overflow valve may be included, which is connected to the top surface of the grate and extends through the insert filter container lip. The overflow valve allows excess fluids to circumvent the insert filter container when fluid is introduced to the filter container assembly at a rate of approximately 80 gallons per minute or more. The overflow valve may further be connected to the top surface of the grate via a hinge, or a plunger-like structure. The insert filter container may be formed in a cylindrical, square, oval, pentagonal, or octagonal shape. The mounting bracket may be disposed within a storm drain.

The present invention is also directed to a filter insert assembly for housing a filter media plug. Said filter insert assembly comprises a filter media plug mounting structure having an exposed horizontal top surface and at least one internal sidewall with a bore for receiving a holding sleeve, said holding sleeve structured for receiving the filter plug at an angle with respect to the horizontal top surface.

In an embodiment, the at least one internal sidewall of the filter media plug mounting structure is shaped to allow for fluid to flow in the direction towards the holding sleeve and filter plug. The filter media plug mounting structure may include a plurality of sidewalls and a base, wherein a height of a first sidewall differs from a height of a second sidewall, and thus the base is angled away from the horizontal top surface. A pre-filter basket may further be included, which is disposed over the bore of the exposed horizontal top surface of the filter media plug mounting structure. The filter media plug mounting structure may receive a plurality of holding sleeves for a plurality of filter media plugs.

The present invention is further directed to a filter insert assembly for receiving a filter media plug. The filter insert assembly comprises a filter media plug mounting structure including vertical sidewalls with top edges and a base plate approximately perpendicular to said vertical walls, said vertical sidewalls and base plate forming an internal cavity. Flanges extend outwardly from said top edges away from said cavity. The base plate is angled with respect to the floor surface. A holding sleeve is disposed on one of said sidewalls or the angled base plate underneath the floor surface. The holding sleeve receives a filter media plug having a filtration media disposed therein for filtering oil and other debris from a fluid. A pre-filter basket having sidewalls composed of a metal liner and a top surface is disposed over the top of the insert box, such that the bottom edges of the pre-filter basket sidewalls align with the top edges of the insert box sidewalls.

In an embodiment, the filter media plug mounting structure may be for installation underneath a liner and above or flush with a floor surface. Batten strips may further be included, which are disposed over the filter media plug mounting structure sidewall top edge flanges and the liner, such that the liner is straddled between the batten strips and sidewall top edge flanges. An upwardly expanding wall may be disposed on a rear of the filter media plug mounting structure and above the holding sleeve. The pre-filter basket may be rotatably secured to the upwardly expanding wall allowing for the top surface to rotate open and closed. The upwardly expanding wall of the filter media plug mounting structure may further be secured to a containment wall disposed behind the filter media plug mounting structure and above the holding sleeve after installation.

The present invention is still further directed to a method of installing a filter insert assembly. The method provides: a horizontal floor surface having a liner disposed on top, a filter media plug mounting structure having sidewalls with flanges extending from their top edges to sit above or flush with the floor surface, and a base plate angled with respect to the horizontal floor surface, and at least one holding sleeve disposed on one of said sidewalls for receiving at least one filter media plug having a filtration media disposed therein for filtering oil and other debris from a fluid. The method includes the steps of: inserting the at least one filter media plug into the at least one holding sleeve within the filter media plug mounting structure at an angle with respect to the horizontal floor surface; mounting the filter media plug structure below the horizontal floor surface with the sidewall top edge flanges disposed between the floor surface and the liner, and the at least one holding sleeve disposed beneath the horizontal floor surface; installing batten strips over the sidewall flanges such that the liner is straddled between the batten strips and the flanges, securing the filter media plug structure in place; and disposing a pre-filter basket having sidewalls composed of a metal liner and a top surface over the top of the filter media plug mounting structure such that the bottom edges of the pre-filter basket sidewalls align with the top edges of the filter media plug structure sidewalls.

In an embodiment, the method may further include the steps of attaching the at least one holding sleeve to a sub-drainage pipe, connecting the sub-drainage pipe to a main drainage pipe, the main drainage pipe which leads into a sump. The method may also include the steps of installing multiple filtration media plug structures, and connecting each filtration media plug structure at least one holding sleeve to a sub-drainage pipe, wherein each sub-drainage pipe connects to the main drainage pipe leading into the sump. The method may alternately include the step of inserting the at least one filter media plug into the at least one holding sleeve within the filter media plug mounting structure occurring after the step of mounting the filter media plug structure below the horizontal floor surface.

The present invention is also directed to a trench filtration assembly for a filter media plug. The trench filtration assembly comprises a housing having a top, a front end for receiving a trench box and a rear end for receiving a sleeve for a filter media plug for filtering oil and other debris from a fluid. A movable top panel is secured to the top of the housing. A bracket is for securing the trench box to the housing front end. The trench filtration assembly is adapted for installation within a trench such that the trench filtration assembly is at least partially within said trench, and the filter media plug extends beyond the housing and outside the trench such that water may only exit the trench through the filter media plug. The trench filtration assembly has a width similar to that of the trench walls so that any fluid passing through the trench enters the assembly only through the trench box installed on the housing front end. A removable grate is disposed within the trench box for preventing the passage of rocks and debris through the housing. A gasket is disposed between the mounting structure and trench box for maintaining a fluid-tight seal between the trench box and housing.

In an embodiment, the trench box is secured to the mounting bracket via bolts. A body of the trench box may be disposed inside of the housing once it is secured to the mounting bracket. The trench box may be rotatably connected to the mounting bracket to allow the trench box to rotate away from the housing. The body of the trench box may be disposed outside of the housing once it is secured to the mounting bracket. The trench box may have flanges extending from its side edges, and the mounting bracket may secure the trench box to the housing via slots disposed on either side of the mounting structure. The slots receive the trench box flanges, and the trench box is disposed outside of the housing once it is secured to the mounting bracket.

The present invention is further directed to a method of installing a trench filtration assembly for an absorption/adsorption media plug. The method provides a trench for the passage of fluid therethrough, the trench having a length, walls covered with a non-permeable liner and a barrier at the end of its length, and a trench filtration assembly having a housing with a front end for receiving a trench box and a rear end for receiving a sleeve for a filter media plug, a top panel movably secured to the top of the housing, a mounting structure for securing the trench box to the housing front end, a removable grate disposed within the trench box for preventing entrance of rocks and debris within the housing, and a gasket. The method includes the steps of: inserting the filter media plug within the housing, such that the filter media plug extends beyond the housing; installing the mounting bracket over the front end of the housing; inserting the housing and filter media plug within the trench such that the filter media plug extends through the trench barrier; disposing the gasket between the mounting bracket and the trench box to maintain a fluid-tight seal between the trench box and the housing; securing the trench box to the housing front end via the mounting bracket; installing a pre-filter grate over the top of the trench box assembly; and placing a trench grate over the top of the pre-filter grate such that it covers a top opening of the trench.

The present invention is also directed to a front end liner pre-filtration assembly for a filter plug. It comprises a liner pre-filtration assembly for disposal over the opening of a liner or curtain. The pre-filtration assembly comprises a post for attaching a liner pre-filtration assembly thereto. A liner box is secured to the post, and has a partially permeable surface. A mounting box has a recess with sidewalls, wherein at least one sidewall is permeable. A mounting bracket secures the mounting box to the liner box such that the liner opening is disposed therebetween. A pre-filter grating is disposed over the mounting box. A gravel guard formed into a bracket or crescent shape is disposed over the liner filtration assembly once the at least two posts, liner box, mounting bracket, mounting box, and pre-filter grating are installed together.

The present invention is still further directed to a method of installing a liner pre-filtration assembly within a liner material for pre-filtration of a fluid. The method provides a non-permeable liner or curtain having sidewalls with inner and outer surfaces for containing a flow of a fluid, a portion of the liner having an opening for the passage of fluid, and a liner pre-filtration assembly that comprises a post for attaching the liner pre-filtration assembly thereto, a liner box with a partially permeable surface for securing to the post and covering the liner opening, a mounting box having a recess with four sidewalls and a permeable base for disposal over the opposite, inner side of the liner opening, a mounting bracket for securing the mounting box to the liner box such that the liner opening will be disposed therebetween, a pre-filter grating for placement over the mounting box, and a gravel guard formed in a bracket or crescent shape. The method includes the steps of: installing the post to the liner outer surface adjacent the liner opening; securing the liner box to the post such that it covers the liner opening; attaching the mounting box to the liner box via the mounting bracket such that the containment liner material is disposed between the mounting box and liner box; placing the pre-filter grating over the mounting box; and surrounding the completed liner filtration assembly with the gravel guard.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 1A:
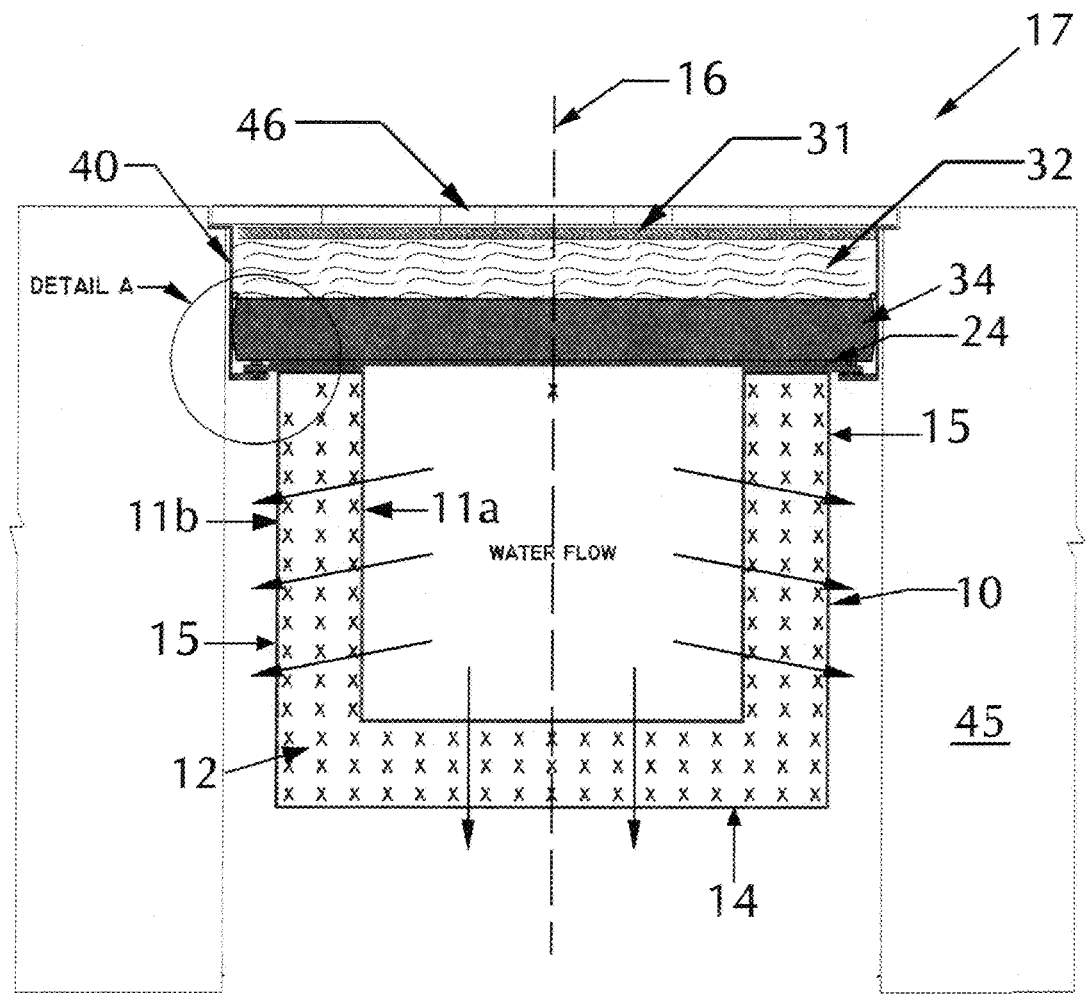
FIG. 1A is a front cross-sectional view of a stormwater insert box or filter container of the present invention.

In describing the embodiment(s) of the present invention, reference will be made herein to FIGS. 1-12 of the drawings in which like numerals refer to like features of the invention.

The filtration media insert structures of the present invention may incorporate the filtration media presented in U.S. Pat. No. 6,841,077 titled "SEPARATION OF HYDROCARBONS FROM HYDROCARBON CONTAINING LIQUID" and filed on Oct. 30, 2002 (the "'077 Patent"); and U.S. Pat. No. 6,485,639 titled "SEPARATION OF HYDROCARBONS FROM HYDROCARBON CONTAINING LIQUID" and filed on Jan. 7, 1999 (the "'639 Patent"); both of which were invented by William Gannon, et al., and assigned to Solidification Products International, Inc. An embodiment of the filtration media insert box described in greater detail below incorporates the filtration media and associated plug structure presented in U.S. patent application Ser. No. 16/732,963 titled "ADSORPTION/ABSORPTION FILTER MEDIA AND METHOD OF MAKING SAME" and filed on Jan. 2, 2020 (the "963 application"), also invented by William J. Gannon. The disclosures of the above are incorporated by reference herein (hereinafter "Incorporated Disclosures"). Other filtration media may be implemented within the insert box of the present invention without any degradation in performance of the insert box; however, filtration aspects of the different filter media will vary according to the filter media properties. Different filtration media may be chosen depending upon the desired filtration characteristics.

Stormwater Insert Filter Container Assembly Embodiment

In a first embodiment of the present invention as shown in FIGS. 1A-1D, a stormwater filter container assembly 17 includes a stormwater insert box or filter container 10 having sidewalls 15 and a base 14 for installation within storm drains (typically underneath a grate) identified as manhole 45, the types of which are commonly located at truck re-fueling stations. These stormwater insert filter containers are typically replaced every 2-3 years, depending on the volumes of oil sheen and dirt introduced into any particular storm drain insert over time.

The insert filter container is cylindrical and has a hollow internal structure, but may be formed in other shapes as desired (e.g., square, oval, pentagonal, octagonal, etc.) to conform to the storm drain in which it will be installed. A metal liner forms both the inside and outside surfaces 11a, 11b of the insert container 10, with the hollow internal structure being bounded by these surfaces. Surface 11b is formed by an outer cylinder having a base and a larger diameter, and surface 11a is formed by an inner cylinder having a base and a smaller diameter, wherein both cylinders 11a, 11b share a same axial center 16. The diameter of the smaller cylinder 11a is small enough to create a gap between the surfaces 11a, 11b and bases thereof to receive a filtration media 12, as shown in FIG. 1A. The filtration media 12 extends from approximately the top perimeter of the insert container, down to and including its base 14. An insert filter container lip or flange 13 extends radially outwards from the top surface of the insert filter container starting at the top edge of inner cylinder 11a, which acts to hold the insert filter container in place within the storm drain or other mounting structure (e.g. a mounting bracket 40) upon installation. Lip or flange 13 further covers the gap formed between the cylinders 11a, 11b, enclosing the filtration media 12 in place within the hollow internal structure.

Figure 1B:
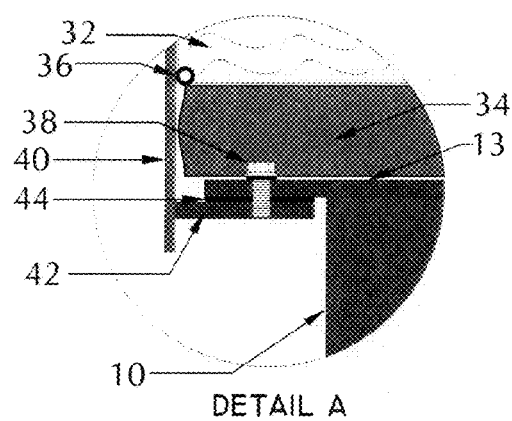
FIG. 1B is a partial cross-sectional view of the connection structure of the stormwater insert box or filter container of FIG. 1A, shown within Detail A.
Figure 1C:
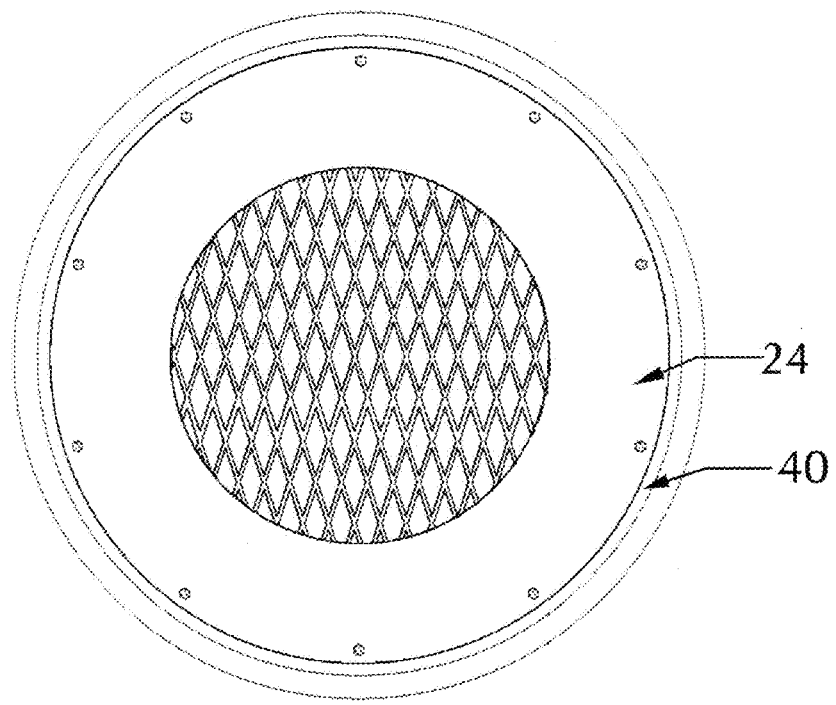
FIG. 1C is a top-down view of the stormwater insert box or filter container of FIG. 1A.
Figure 1D:
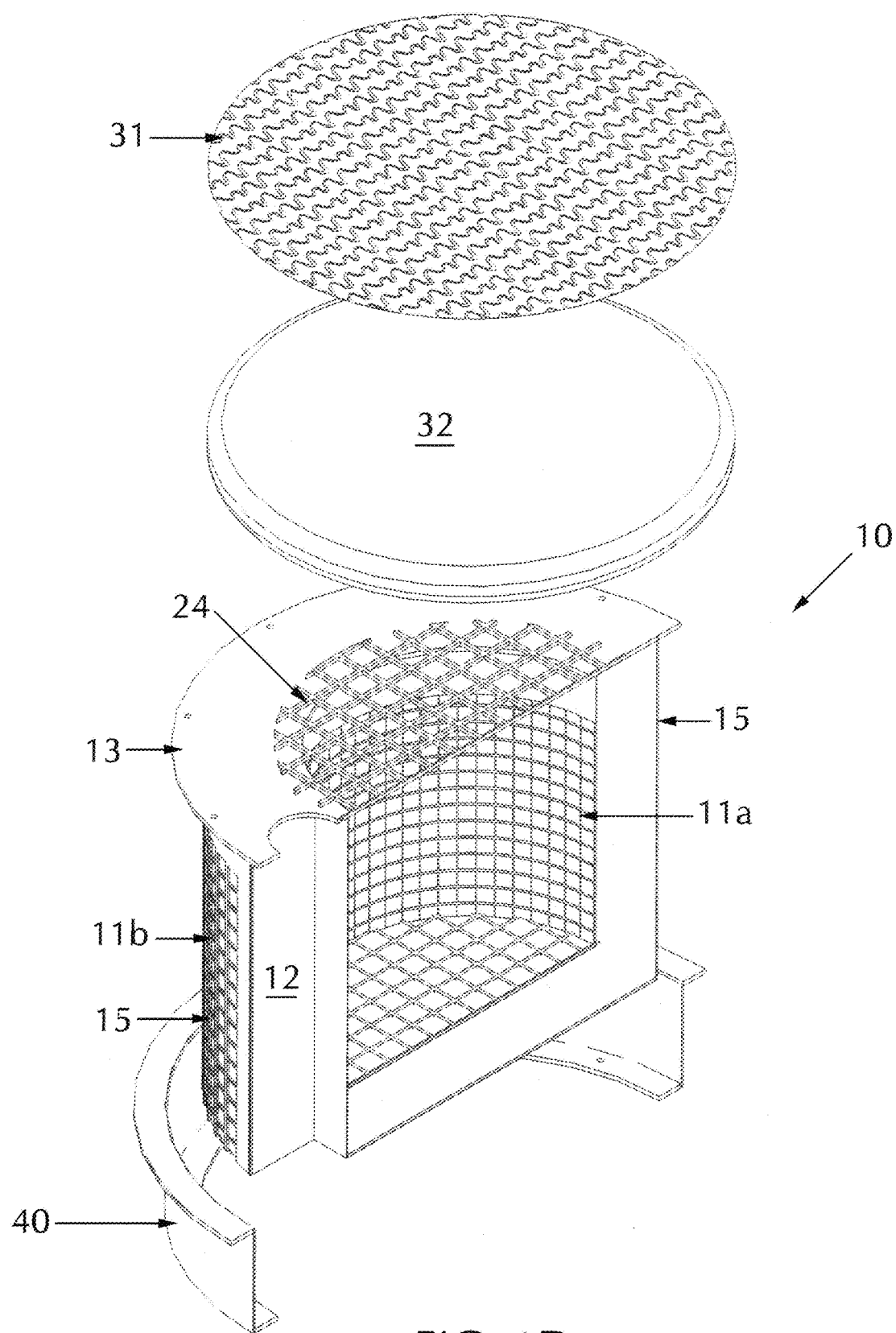
FIG. 1D is a partial cross-sectional exploded view of the stormwater insert box or filter container of FIG. 1A.

FIGS. 1A-1B, and 1D present cross-sectional side and perspective views of an embodiment of the stormwater insert box or filter container assembly 17 after installation, with FIG. 1B showing the more detailed features presented within Detail A of FIG. 1A. The complete installation presents the stormwater insert filter container 10 disposed within and being held by the cylindrical mounting bracket 40 having a cavity disposed substantially in the middle. A mounting flange 42 extends perpendicularly away from the sidewalls of the mounting bracket 40 for the outwardly extending lip/flange 13 of the container 10 to rest on after the insert filter container 10 is inserted within the mounting bracket cavity. Once in place, a fastener 38 (e.g., a screw, nail, dowel, magnet, clamp, bolt, rivet, pin, etc.) extends through the insert container flange 13 and mounting flange 42 to create a fluid-tight seal and secure the container 10 within the drain. A silicone gasket 44 may be disposed between the mounting flange 42 and extending lip 13 for improved sealing purposes, the gasket 44 which would also be held in place by the fastener 38. See FIG. 1B.

After the insert filter container 10 is affixed to the mounting bracket 40, a grate barrier 24 (which may be comprised of aluminum, stainless steel, iron, or any other suitable material) is disposed over the top opening of the insert container 10. This grate 24 may comprise a permeable, flow-through portion on all or a part of its surface (as exemplified in FIG. 1C), depending on the installer's preference. A pre-filter pad 34 is disposed over the top of the grate 24, which expands from approximately the inside edges of the mounting bracket 40, as shown in FIG. 1A. A pre-filter batting 32 may further be disposed on top of the pre-filter pad 34 in a like manner (which also expands from wall to wall within the mounting bracket 40) to add a layer of protection to the pre-filter, and provide even further filtration, if so desired by the installer.

Figure 2A:
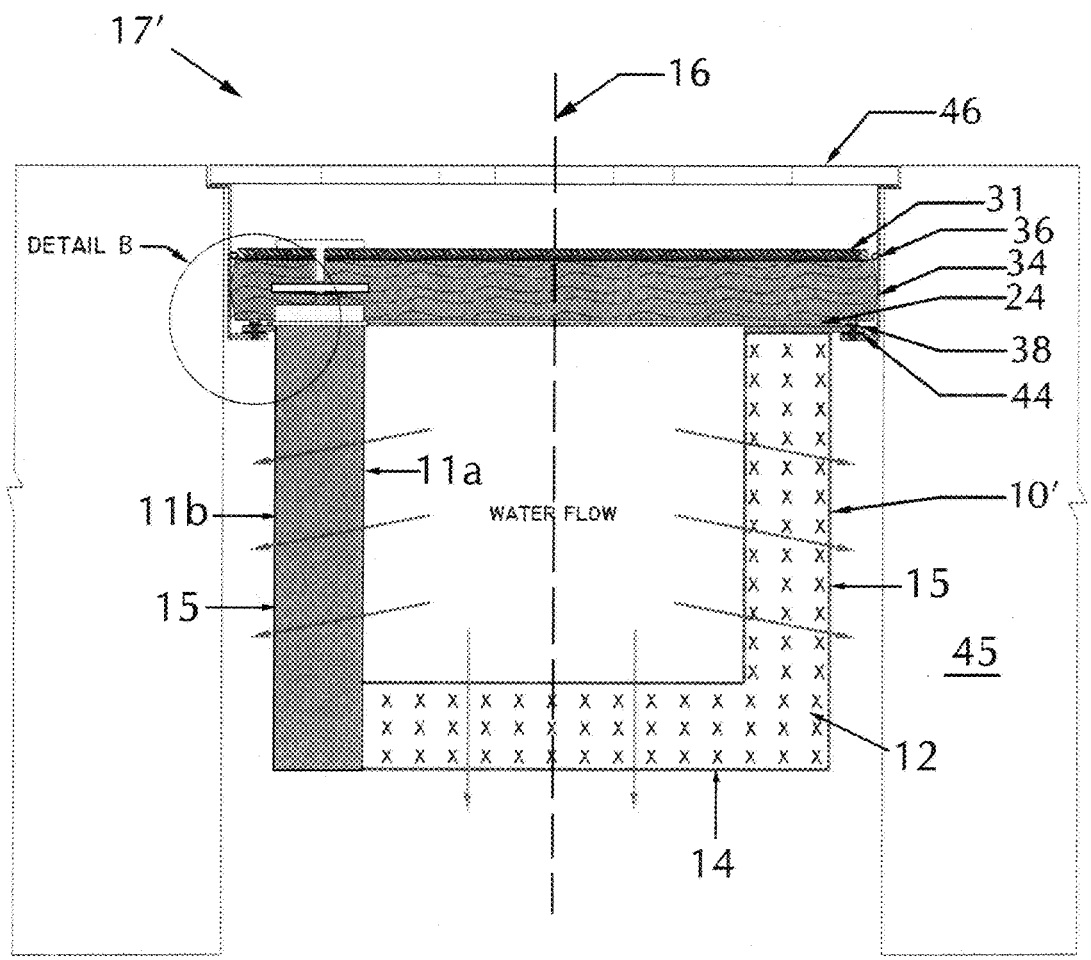
FIG. 2A is a front cross-sectional view of an alternate embodiment of a stormwater insert box or filter container of present invention incorporating an overflow valve.
Figure 2B:
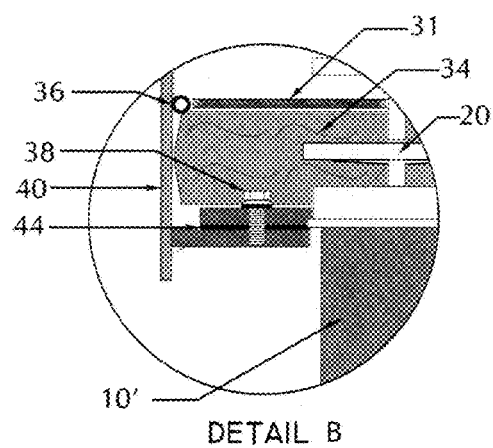
FIG. 2B is a partial cross-sectional view of the connection structure and overflow valve of the stormwater insert box or filter container of FIG. 2A, shown within Detail B.
Figure 2C:
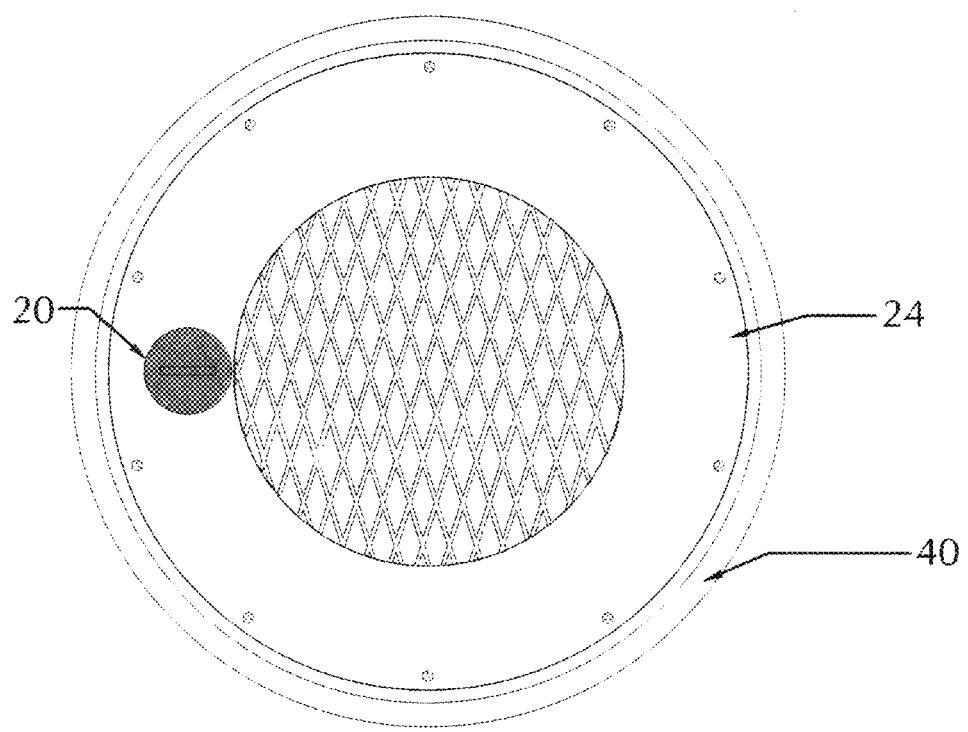
FIG. 2C is a top-down view of the stormwater insert box or filter container of FIG. 2A.
Figure 2D:
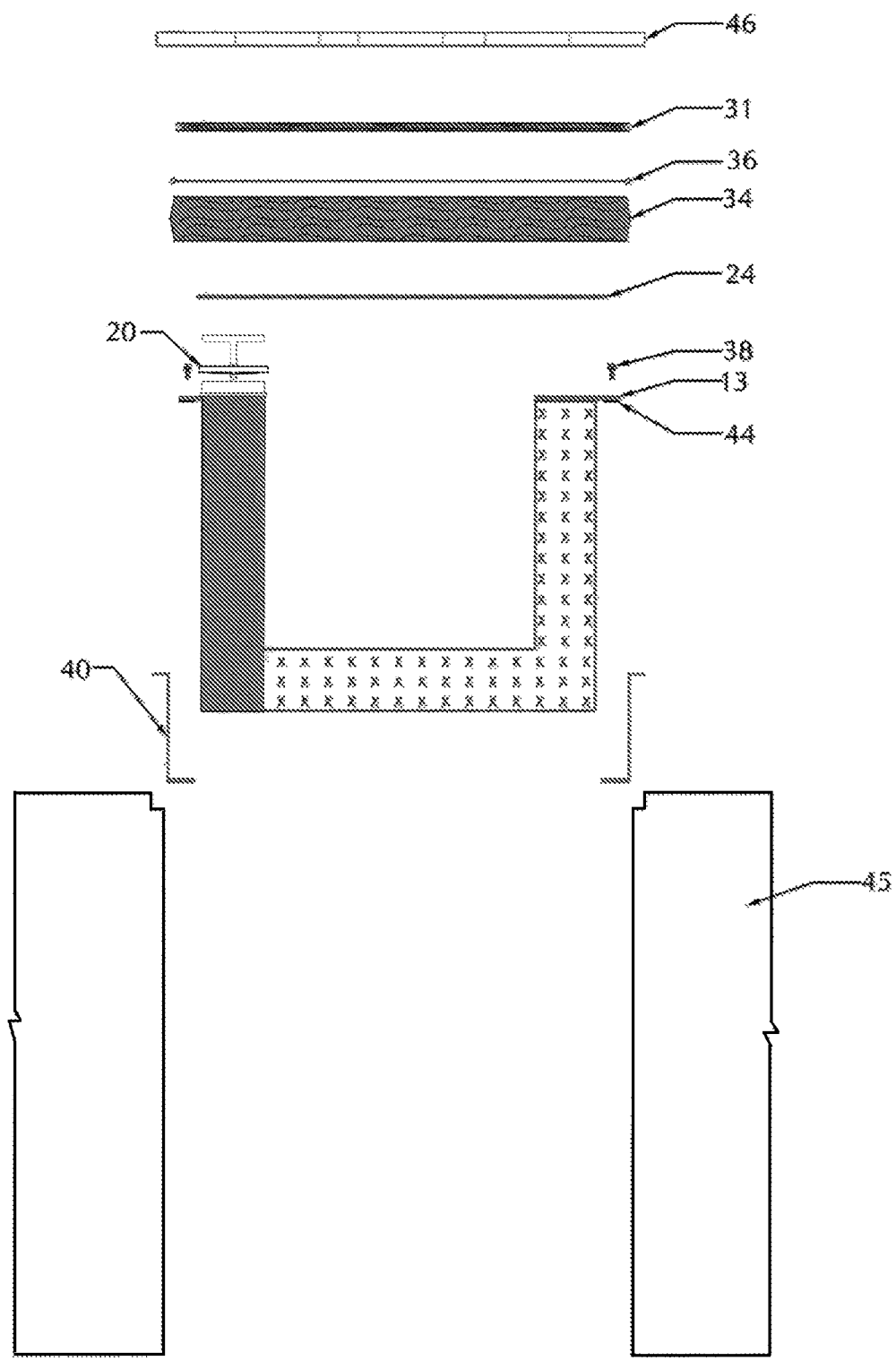
FIG. 2D is a front, cross-sectional, exploded view of the stormwater insert box or filter container of FIG. 2A.

In an embodiment of a stormwater insert filter container assembly 17', an overflow valve 20 is equipped with a second embodiment of the stormwater insert box/filter container 10' as shown in FIGS. 2A-2D to be used in the event that the insert filter container 10' is exposed to fluids entering the box at approximately a rate of 80 gallons per minute ("gpm") or more, or becomes clogged. This overflow valve extends through the top surface of grate barrier 24 via a plunger-like structure, as shown in FIG. 2A, and FIG. 2B (which presents the more detailed portions of Detail B within FIG. 2A) and connects to the lip or flange 13 of the insert filter container 10'. The overflow valve 20 may be manually activated by either a handle or by spring action. Once activated, the overflowing filter container assembly 17' is relieved of the high volumes of water via circumventing the stormwater filter container 10' and flowing directly into the drain.

A filter bag (not shown) such as a micro-mesh, or free-flow mesh 31 (as shown in FIGS. 2A-2D) composed of a filtering fabric may be included with the insert container 10' to act as a pre-filter which captures dirt and debris that might be carried into the insert container by flowing water. This filter bag/mesh is placed inside of the insert container to cover the base and sidewalls. Further micro-mesh material may be disposed over the top surface of the stormwater insert box/filter container to cover the entirety of its opening and provide further pre-filtering capabilities.

Installation of the second embodiment of the insert container 10' into an existing manhole 45 (underneath a manhole grate 46) is substantially the same as with the first insert container embodiment 10. Thus, the number labels across FIGS. 2A-2D (which represent the second embodiment) represent the same features numbered across the first insert filter container 10 embodiment, as shown in FIGS. 1A-1D.

In use, the stormwater filter container embodiments shown across FIGS. 1A-2D may take in high volumes of rain water or other fluids. In many instances, these high volumes of water contain oil sheen picked up from the surrounding environment, such oil sheen including, but not being limited to, diesel, gasoline, hydrocarbon oils, transmission fluids, general fuels, or the like. The water and oil sheen mix enters through the center cavity of the insert box 10 or 10' and discharges through the insert container base 14 and sidewalls 15 containing the filtration media 12. The filtration media within the insert container are designed to remove the oil sheen from the water, adsorbing or plugging the oil sheen within the filtration media as the contaminated fluid continues to flow through it.

In the stormwater insert box or container embodiments that include the filter bag/mesh and/or manual overflow valve, the possibility of clogging may eventually occur after prolonged exposure to water and oil sheen mixtures. Furthermore, dirt and debris brought into the stormwater insert box assembly 17' may eventually build up in the filter bag or insert container 10' to impermeable levels, resulting in overflow issues. Should this occur, an end user may engage the overflow valve 20 to allow the building fluid to circumvent the insert container and pass into the below storm drain so as to avoid excessive pooling on the surface. Furthermore, the stormwater insert container is capable of completely sealing itself and preventing flow of all liquid in instances where an overload of hydrocarbons or oil is introduced into the stormwater container.

A further embodiment is presented as a method of installing a stormwater filter container, comprising the steps of: placing a mounting bracket having a mounting bracket flange and a cavity within a storm drain; providing an insert filter container having a hollow internal structure bounded by inside and outside surfaces with a filter media contained therein, wherein said inside surface forms a cavity; providing an insert filter container lip or flange enclosing a top portion of said hollow internal structure; inserting the insert filter container within the mounting bracket cavity, such that the mounting bracket flange supports the insert filter container by the insert filter container lip or flange within the mounting bracket cavity; disposing a grate over the top of the insert filter container and inside the mounting bracket; and covering the top of the grate with a pre-filter pad also disposed inside of the mounting bracket.

Angling Filter Insert Assembly Embodiment

In another embodiment of the present invention as shown in FIGS. 3A-5B, a filter media plug structure 60 that may encompass the filter material of the aforementioned incorporated filter media disclosures is installed into a filter media insert assembly 50, 50' designed to hold the filter media plug 60 at an angle substantially between a predetermined angle of 15°-35° with respect to the horizontal floor. An alternate embodiment of the plug material used herein may include a mixture of the polymers disclosed in the Incorporated Disclosures for the absorption/adsorption of synthetic ester-based fluids and a filter media for the absorption/adsorption of regular mineral oils.

In prior art embodiments of the filter media insert assembly, the plug or container that contained the absorption material was situated vertically, so that gravity flow was maximized. At the angle provided in conjunction with this embodiment of the filter media plug mounting structure of the present invention, water/oil flow rate decreases by about 10-15% as opposed to a vertically oriented plug, but the required amount of material needed for proper absorption and drainage to occur is effectively reduced to ⅓ of that required in the same vertical plugs. This angled design—although counter-intuitive for gravity-flow—is more cost-effective to manufacture, and produces the same absorption results as the vertical plugs, and provides the unexpected result of achieving equivalent or better filtration while utilizing less filter media than a vertically oriented plug.

Furthermore, the top layer of material covering the plant floor may lack the depth needed to properly install a vertically oriented plug, as the plug may extend past proper drainage points into layers of dirt lacking the porosity needed for water to properly drain into, which may result in a premature clogging of the plug. The plug angle(s) created by the filter insert assembly, and more specifically the filter media plug mounting structure of the present invention thus address this issue by requiring less depth for installation.

The filter insert assembly 50 of an embodiment of the present invention presents a filter media plug mounting structure 51 having an angled base plate 57 and four walls 52*a*, 52*b*, 52*c*, 52*d*, and a pre-filter basket 80 as shown in FIGS. 3A and 3C-3E. While the plug mounting structure 51 shown in FIGS. 3A-3E is composed of an aluminum material, the media plug mounting structure may alternately be composed of stainless steel, plastics, or any other material suitable for the functions described herein, provided the material can withstand the caustic effects of the flowing liquids. Within the assembly, opposing sidewalls 52*a*, 52*b* are formed with their perimeters having a trapezoidal or triangular shape (shown in FIGS. 3A and 3C, respectively), and opposing front and rear walls 52*c*, 52*d* are formed as parallelograms having different heights with respect to each other. If the opposing sidewalls 52*a*, 52*b* are triangular as in the embodiment depicted in FIG. 3C, then no baseplate 57 will be present, or front wall 52c will act as the baseplate.

Figure 3A:
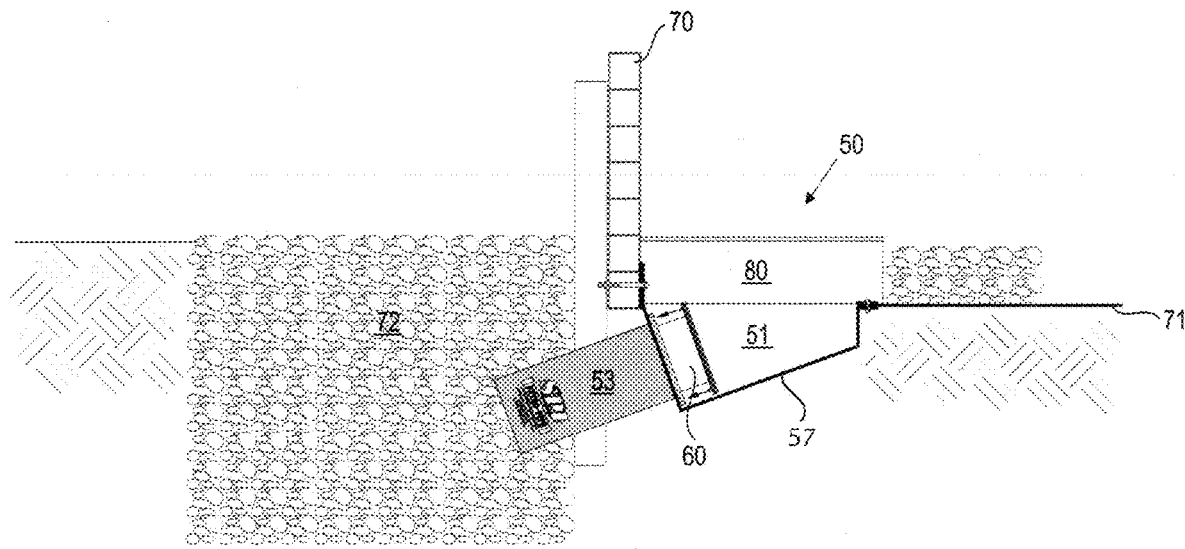
FIG. 3A is a side cross-sectional view of a filter insert assembly of the present invention, the filter insert assembly shown as being installed in a drainage area.
Figure 3B:
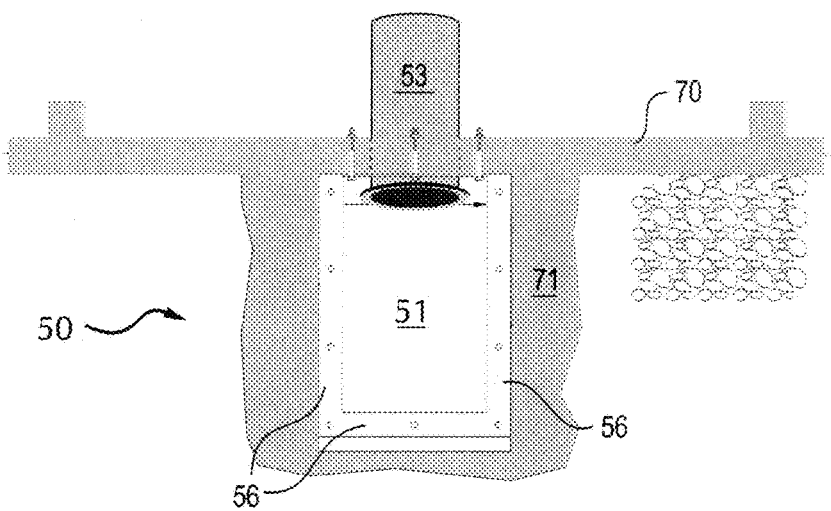
FIG. 3B is a top-down view of a filter media plug mounting structure of the filter insert assembly of FIG. 3A.
Figure 3C:
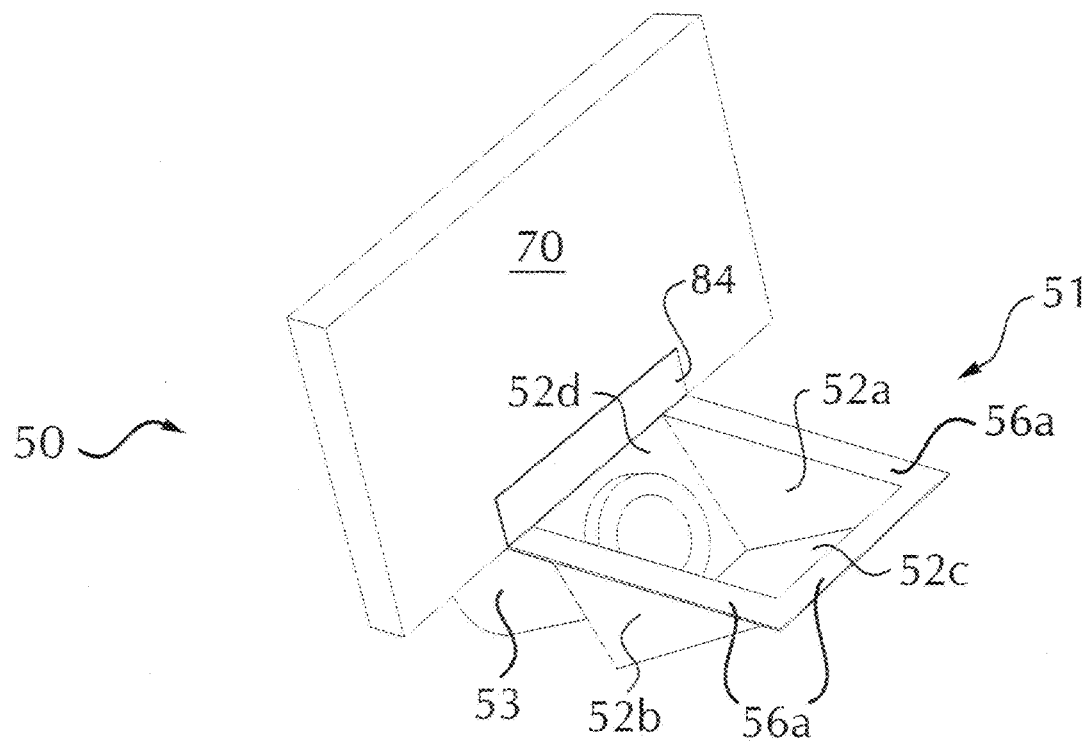
FIG. 3C is a perspective view of the filter insert assembly of FIG. 3A excluding a pre-filter basket.
Figure 3D:
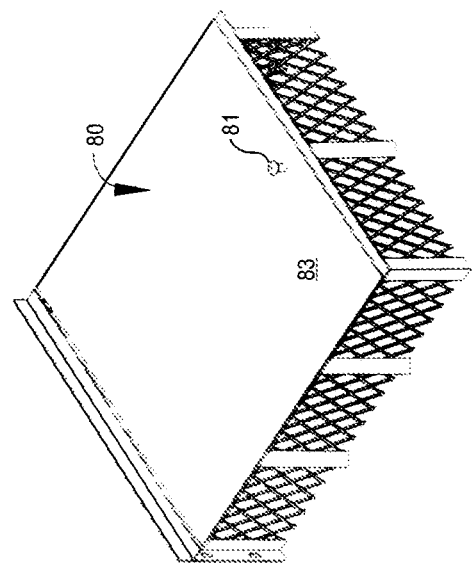
FIG. 3D is another perspective view of the disassembled filter insert assembly of FIG. 3A.
Figure 3D:
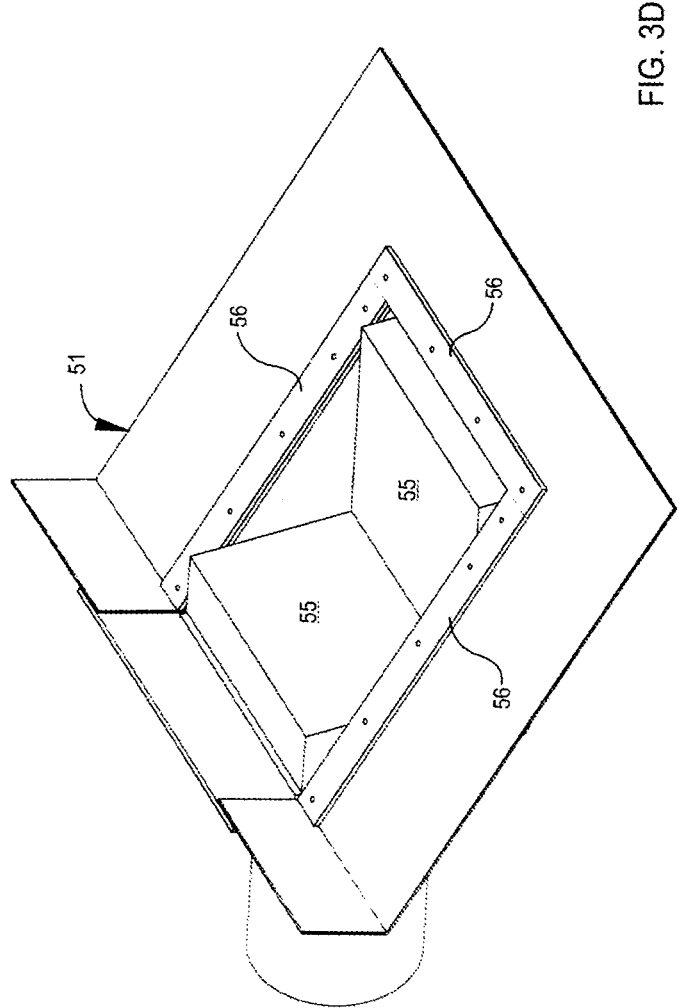

The rear wall 52d of the plug mounting structure is higher than the front wall 52c and contains a bore for receiving a holding sleeve 53 disposed through its axial center. The sleeve receives and holds the filter media plug 60 therein. Sleeve 53 is sealed and secured to the rear wall 52d of the plug mounting structure 51, such that no fluid entering the structure 51 may bypass the sleeve 53 without first passing through the plug 60. The downward-sloping angle of the baseplate 57 to which the rear wall connects to accounts for the desired angle of the filter media plug as described above. When the filter insert assembly 50 is properly installed flush with the ground, the bottom surface or baseplate 57 of the plug mounting structure 51 (including sleeve 53 and plug 60) angles away from said ground, or from the horizontal top surface of the structure 51, as best shown in FIG. 3A.

On the top surface of the plug mounting structure are flanges which expand outwardly along a horizontal top surface or plane and perpendicularly from three out of four sides of the plug mounting structure's perimeter or top edges of walls 52a-52c. Batten strips 56 are placed over these flanges to straddle a pre-existing liner 71 coating the power plant's floor. One side of the perimeter of the plug mounting structure has an upwardly expanding wall 84 which extends perpendicularly to the planar floor upon installation. This upwardly expanding wall comprises holes disposed about its face for receiving fasteners (e.g. bolts, screws, nails, etc.) to secure the rear of the plug mounting structure to a thick containment wall 70 (or any other type of wall structure) typically a fiberglass wall on the order of 3" thick, and disposed behind the plug mounting structure 51 and above the plug or holding sleeve after installation.

Figure 3E:
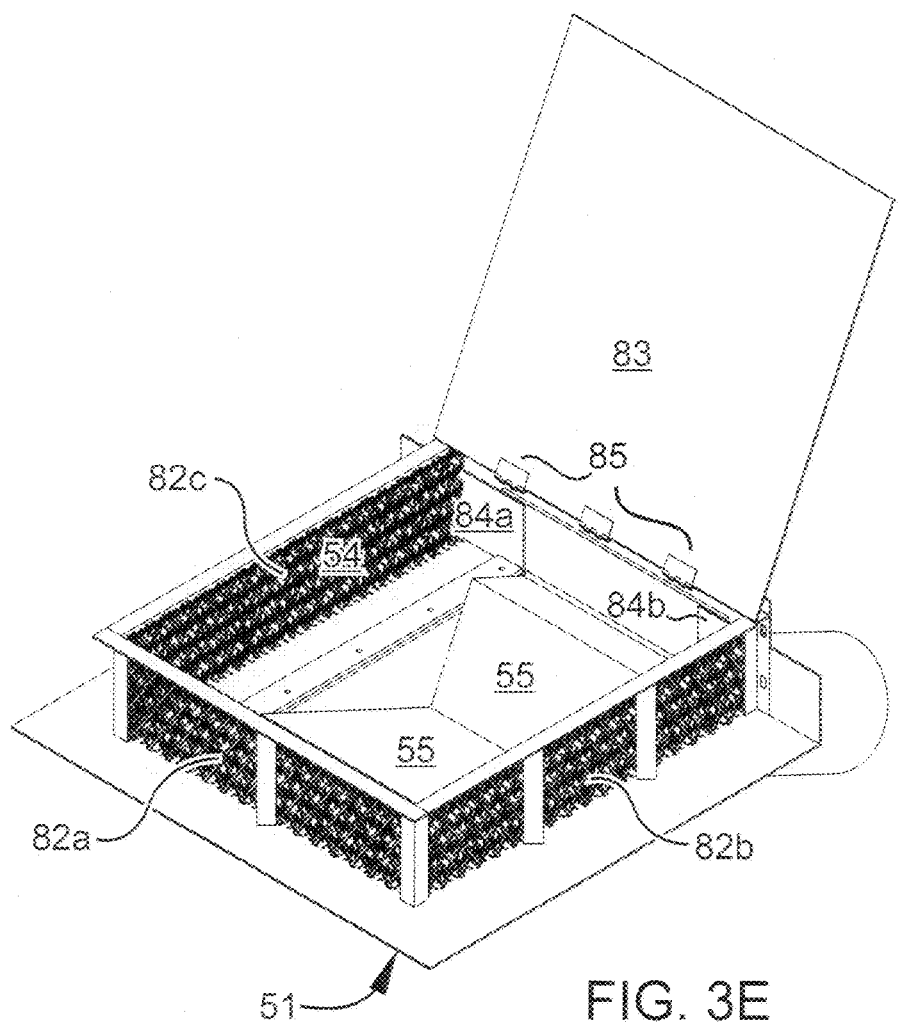
FIG. 3E is yet another perspective view of the filter insert assembly of FIG. 3A.

The pre-filter basket 80 is provided with the structure 51 to complete the assembly 50 (or assembly 50' as described below), as shown in FIG. 3E. The pre-filter basket has a solid top surface 83 with a handle 81, and three sidewalls 82a, 82b, 82c comprising a metal liner disposed on the front and sides of the pre-filter basket. The rear of the pre-filter basket comprises two metal plates 84a, 84b extending partially inward from the corners, with an open gap disposed between them. The solid top surface and two metal plates of the rear of the pre-filter basket are connected via hinge structures 85, to allow the solid top surface 83 to swing open or rotate in an upward arc upon pulling up on the handle.

To install the pre-filter basket onto the plug mounting structure, the rear two metal plates 84a,b of the pre-filter basket 80 are aligned with the rear upwardly expanding wall of the plug mounting structure and attached to each other by clamps, welding, fasteners (e.g. bolts, rivets, or screws), or by any other means of connecting two metal surfaces together. Additional foam filter sheets 54 may be placed on the inside surfaces of the pre-filter basket sidewalls 82a, 82b, 82c, and foam filter blocks 55 may be inserted within the plug mounting structure 51 to further prevent entry of any rocks, dirt, or debris that may pass through the initial metal liner sidewalls of the pre-filter basket 80.

Figure 4A:
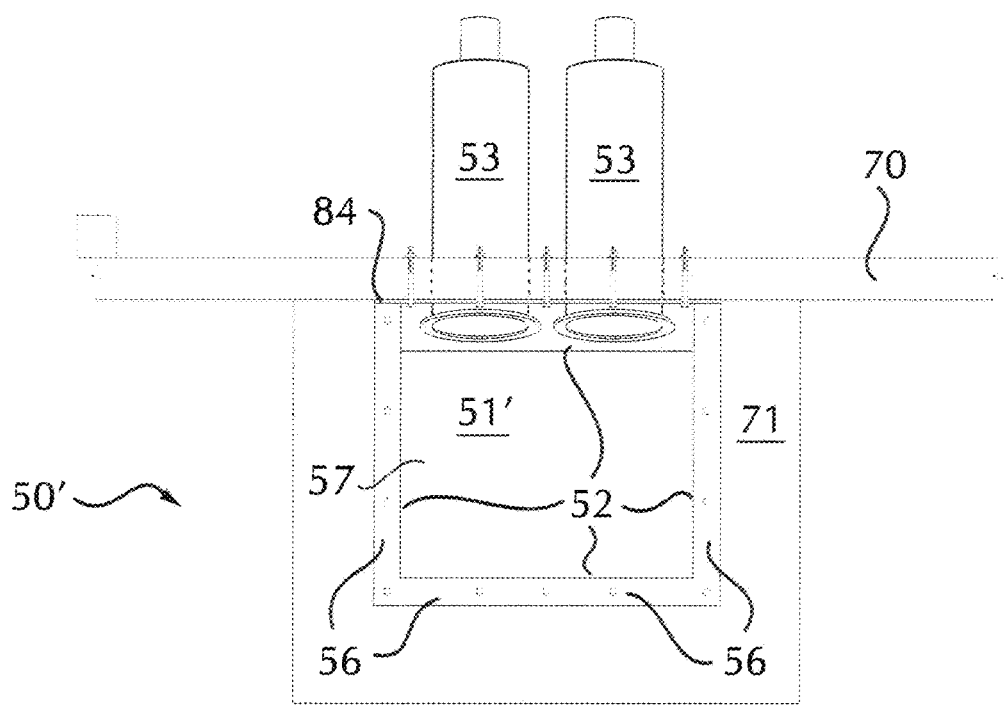
FIG. 4A is a top-down view of an alternate embodiment of a filter media plug mounting structure of a filter insert assembly of the present invention, wherein two holding sleeves are connected to the box instead of one.
Figure 4B:
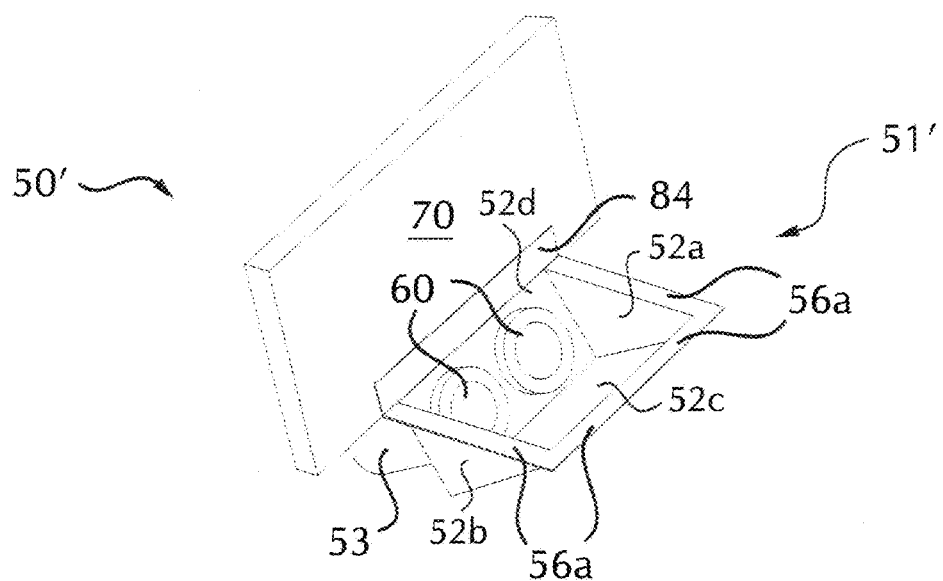
FIG. 4B is a perspective view of the filter media plug mounting structure of FIG. 4A.

In alternative embodiments of the filter insert assembly 50', more than one plug 60 and associated holding sleeve 53 may be installed within a plug mounting structure 51', as shown in FIGS. 4A-4B. All remaining structures of the filter insert assembly 50' mimic that of the first embodiment insert assembly 50. This insert assembly 50' has a greater capacity to handle higher volumes of water and oil flow therethrough, and is additionally capable of absorbing more than a single plug embodiment counterpart. If the opposing sidewalls 52a, 52b are triangular as in the embodiment depicted in FIG. 4B, then no baseplate 57 will be present, or front wall 52c will act as the baseplate. The insert assembly 50' includes the pre-filter basket 80 and associated features as previously described, including the connection structure and rotatable actions.

Figure 5A:
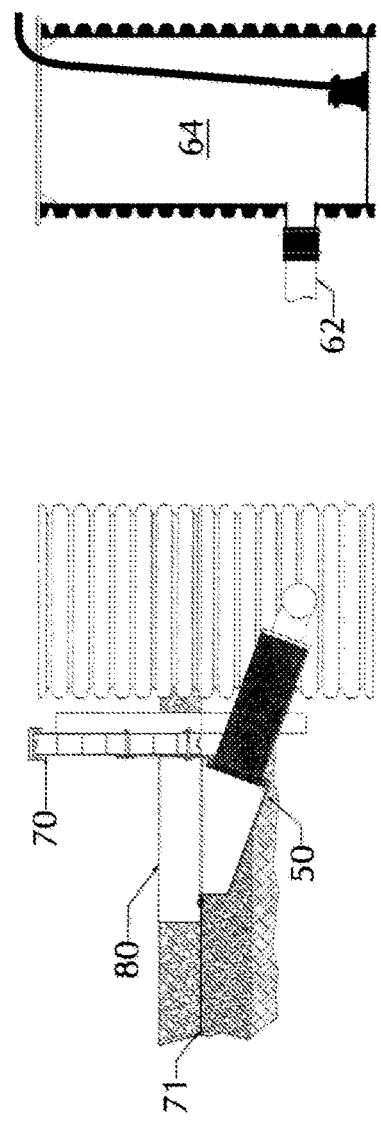
FIG. 5A is a side cross-sectional view of an in-situ installation of a drainage system including the filter insert assembly of FIG. 3A, connected to a sump pump of the present invention.
Figure 5B:
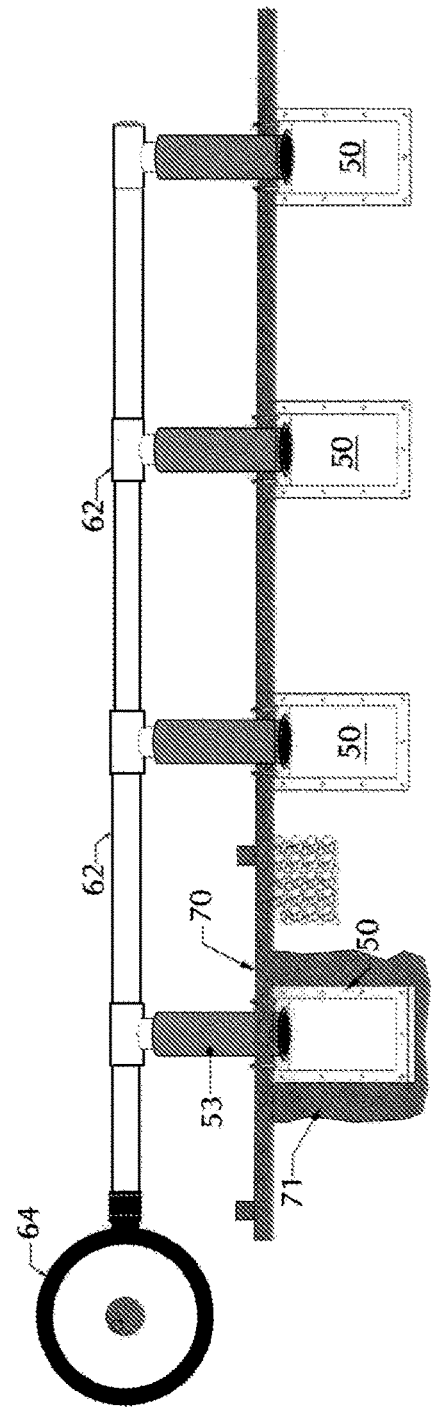
FIG. 5B is a top-down view of an in-situ installation of a drainage system incorporating multiple filter insert assemblies of FIG. 3A.

An example in-situ installation of the plug and assemblies 50, 50' is depicted in FIGS. 3A-5B. While FIGS. 5A-5B show example installations of the filter insert assembly 50, embodiment 50' may be installed in a similar manner without necessitating much modification. Once the plug 60 is installed within the plug mounting structure 51 or 51' (into the sleeve 53), the assembly is placed in a hole dug into and beneath an existing floor/liner 71 (such as, but not limited to, bentonite, or other clay-based liners) so that the top surface of the mounting structure sits flush with the liner/floor. The pre-filter basket 80 lays just above the liner/floor 71, with the pre-filter basket sidewalls extending perpendicularly upward from the liner/floor. The flanges extending from the plug mounting structure top surface lie just underneath the liner upon installation, and the upwardly expanding wall 84 on the fourth (rear) side of the plug mounting structure sits flush against the fiberglass containment wall 70. The batten strips 56 are placed around the plug mounting structure on top of the flanges so that the liner 71 is straddled between the flanges and batten strips. Fasteners are used to secure the batten strips to the mounting structure flanges with the liner disposed between, and to secure the rear upwardly expanding wall 84 to the fiberglass containment wall, all which holds the plug mounting structure securely in place. The plug portion of the assembly extends beneath and past the containment wall into a drainage pit 72 filled with crushed stone, or any other suitable material such as sand, river stone, etc., located on the side of the containment wall opposite the assembly.

A fuller exemplified cross-sectional side view, and top-down view of the in-situ installation of the drainage system is shown in FIGS. 5A-5B, respectfully, where multiple assemblies 50 (or 50' if so desired) are installed along the same containment wall 70. These arrayed installations may be seen at larger scale power plants. Each plug sleeve 53 traversing through wall 70 is attached to a drainage pipe 62, which all connect to a main drainage pipe leading into a sump 64. In embodiment 50' of FIGS. 4A-4B, two drainage pipes 62 will be connected to the two plug sleeves 53 protruding from the plug mounting structure 51'. Filtered water that successfully traverses through the assemblies 50, 50' are fed into the sump via the drainage pipe 62. A fitting may further be attached to the drainage pipe 62 that allows for drainage to another area or pump as water continues to accumulate within the sump 64.

The assemblies 50, 50' of the present invention are not limited strictly to power plants or tank farms (facilities used for the storage of oils or chemicals) with bentonite floor liners, but may also be installed in such locations utilizing concrete floors or fabric-lined floors, among other types of floor material.

The installed filter insert assembly serves the purpose of filtering oil or fluid that mixes with rain water or other liquids in the event of a spill. As the combined oil and water begins to flow within the power plant, rocks and other debris may be picked up and heterogeneously mixed with the combined oil/water. As this heterogeneous mixture flows into the assembly, the pre-filter basket separates the rocks and other large debris from the oil/water mixture and prevents them from entering the inside of the assembly, where they would otherwise clog the plug.

The remaining water and oil mixture entering the assembly runs down and into the plug at the bottom of the plug mounting structure, where the oil is absorbed/adsorbed by the filter media located inside of the plug. The remaining filtered water traverses out through the plug and into the drainage pit located on the other side of the containment wall. The filter media and plug functionality are described in greater detail in the aforementioned Incorporated Disclosures.

Trench Box Embodiment

In yet another embodiment of the present invention, as depicted in FIGS. 6A-8G, a plug structure and filtering material, such as that of the aforementioned Incorporated Disclosures, is installed into a trench filtration assembly 100, 100', or 100" designed to hold the filter media plug within a sleeve secured to a housing 110 and a trench box 118, the assembly 100-100" which is installed into a trench 130 below surface level. The sleeve 60 is secured to the housing such that no water may escape around the outside of the sleeve, and any water entering into the assembly must exit through the sleeve 60 and filter media plug disposed therein. An alternate embodiment of the plug material used herein may include a mixture of the polymers disclosed in the Incorporated Disclosures for the absorption/adsorption of synthetic ester-based fluids and a filter media for the absorption/adsorption of regular mineral oils.

Trench filtration assemblies 100-100" include the housing 110 with a front end and rear end, the assemblies 100-100" further having an aluminum top panel 112 movably connected to the top surface of the housing, a mounting bracket 114, 114', or 114", a gasket 116 disposed between the bracket 114-114" and trench box 118, and a pre-filter material 120, 121 disposed within the trench box. Trench box 118 may further include a removable grate 119 disposed within the confines of the box for preventing passage of rocks and debris through the trench box's outer walls. The size and shape of the trench filtration assembly 100-100" may be of any suitable configuration specific to each instance of installation, with no negative impact on its functionality. The dimensions of the trench 130 will dictate the configuration and dimensions of the assembly 100.

The trench filtration assembly may be assembled in a variety of ways, as exemplified across embodiments 100-100" of the trench filtration assembly. For example, a first embodiment of the assembly 100 employs the trench box 118 bolted into the mounting bracket 114, which is secured to the front end of the housing 110, as presented in FIGS. 6A-6G. During installation, the media plug sleeve 60 is placed in the trench and runs through a barrier within the trench 130, i.e., a stone or concrete wall, liner, or any other non-permeable surface. One end of the plug sleeve 60 sits within the rear end of housing 110, while the other end discharges filtered water past the trench 130 barrier, typically into a drainage pipe running to an outside drain. Trench box housing 110 encloses the plug within itself in a fluid-tight seal. In all embodiments 100-100", top panel 112 may be rotated to an open position or removed for easy access to the plug within the sleeve 60, thus facilitating replacement once the filter media within the plug is used up or clogged.

Mounting bracket 114 is installed onto the outer face of housing 110, with the body of mounting bracket 114 being enclosed within the housing. A gasket 116 is placed around the outer perimeter of the mounting bracket 114. Pre-filter material 120 and additional filtration media 121 are then disposed within the trench box 118, which is then inserted into the housing 110 and secured to the bracket 114 via bolts (the trench box insertion shown by the dashed arrow in FIG. 6D). Gasket 116 seals off the inside of housing 110 after bracket 114 is installed to prevent any water from bypassing the pre-filter and additional filter materials 120, 121 located both inside of the housing 110 and trench box 118. The gasket 116 and grate 119 of the trench box 118 ensure that no rocks or other debris will build up inside of the housing 110 or box 118 and create clogging.

In a second embodiment of the trench filtration assembly 100', mounting bracket 114' has receiving grooves running along the side edges on the mounting bracket's 114' outer perimeter, as demonstrated in FIGS. 7A-7G. Installation of the assembly 100' is the same for all components except for how the trench box 118 is secured to the mounting bracket 114'. In this embodiment, flanges extending from the trench box 118 slideably fit within the mounting bracket 114' receiving grooves to secure the box 118 in place upon installation (as shown by the dashed arrow in FIG. 7D). Gasket 116 ensures the connection between the box 118 and bracket 114' is fluid-tight. Due to the nature of connection between the box 118 and bracket 114', the body of the box 118 protrudes outside of the housing 110, instead of inside the housing 110 as it does in aforementioned first embodiment of the trench box assembly.

Another embodiment of the trench filtration assembly 100" shown in FIGS. 8A-8G utilizes a mounting bracket 114" connected to the trench box 118 via hinges located at either the top or bottom edge of the bracket 114". Installation of the assembly 100" is the same for all components except for how the trench box 118 is installed within the mounting bracket 114". In this embodiment, trench box 118 can swing open and away in either an upward or downward arc from the housing 110 via the hinges located on the bracket 114" (as shown by the dashed arrow in FIG. 8D). This allows for easy access and replacement of the plug within sleeve 60. Gasket 116 ensures the connection between the box 118 and bracket 114" is fluid-tight. While the body of box 118 is shown protruding outside of housing 110 in this embodiment, the body of the box 118 may instead protrude inside of housing 110 and still properly swing out and away from housing 110 if the installer so desires.

Figure 6A:
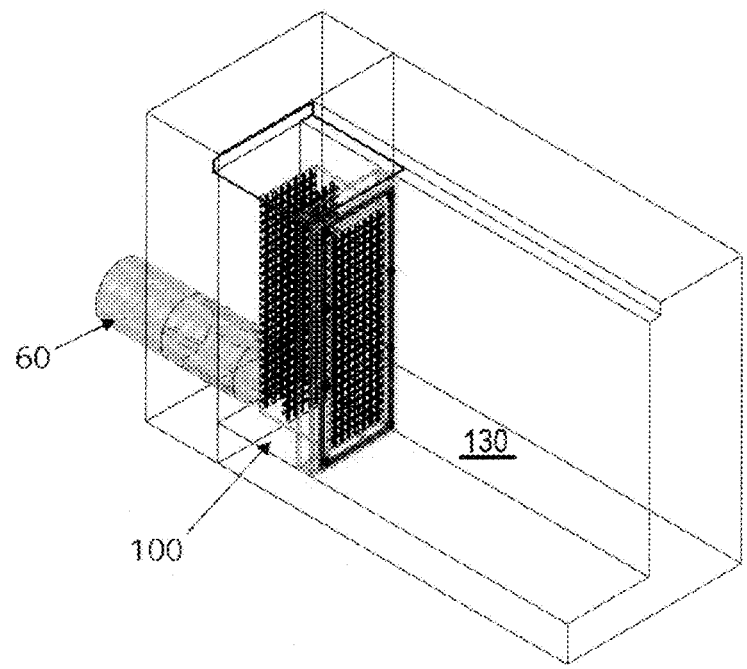
FIG. 6A is a perspective view of an embodiment of a trench filtration assembly of the present invention using a bolted connection structure.
Figure 6B:
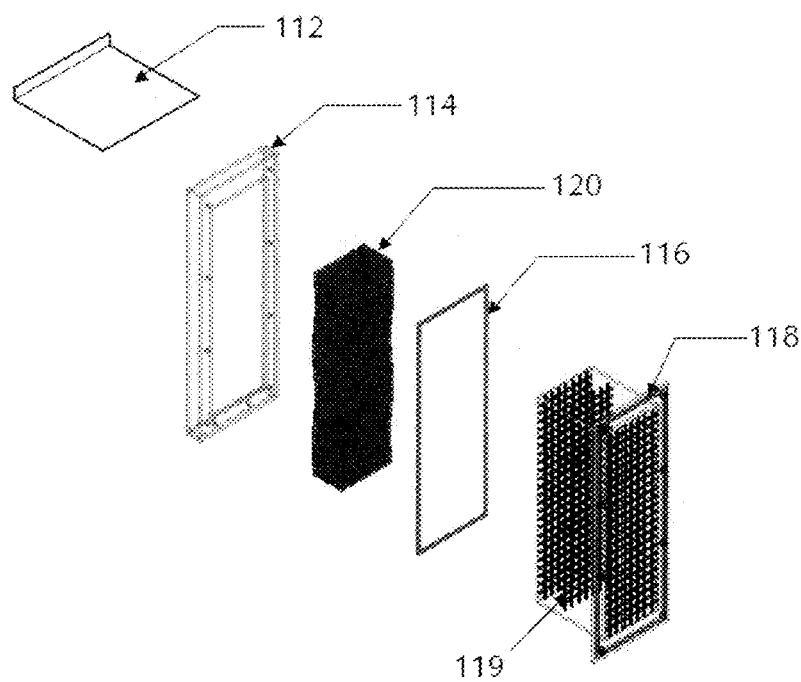
FIG. 6B is a perspective exploded view of the trench filtration assembly of FIG. 6A excluding the trench and housing.
Figure 6C:
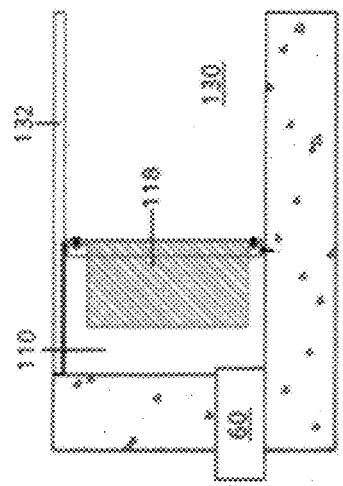
FIG. 6C is a side cross-sectional view of the trench filtration assembly of FIG. 6A.
Figure 6F:
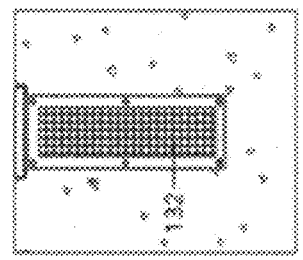
FIG. 6F is another side cross-sectional view of the trench filtration assembly of FIG. 6A.
Figure 6E:
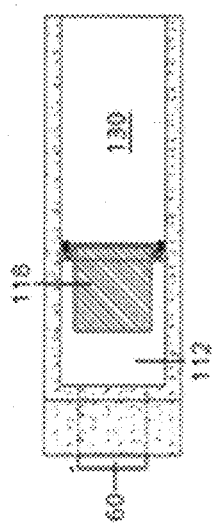
FIG. 6E is a top-down cross-sectional view of the trench filtration assembly of FIG. 6A.
Figure 6D:
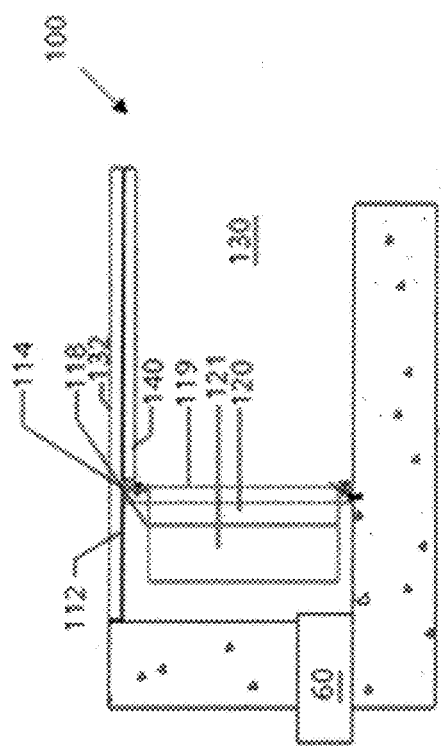
FIG. 6D is a side view of the trench filtration assembly of FIG. 6A showing the installation of the trench box into the housing.
Figure 6G:
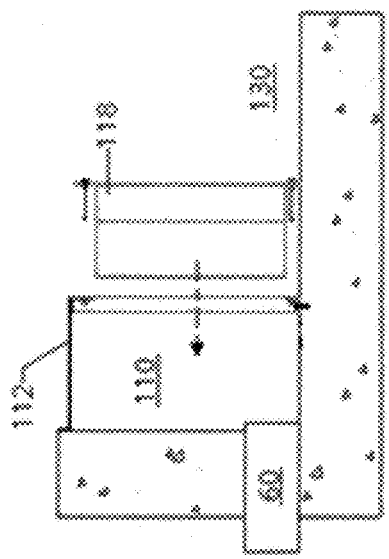
FIG. 6G is another top-down view of the trench filtration assembly of FIG. 6A showing the pre-filter grate disposed over the top of said trench filtration assembly.
Figure 7A:
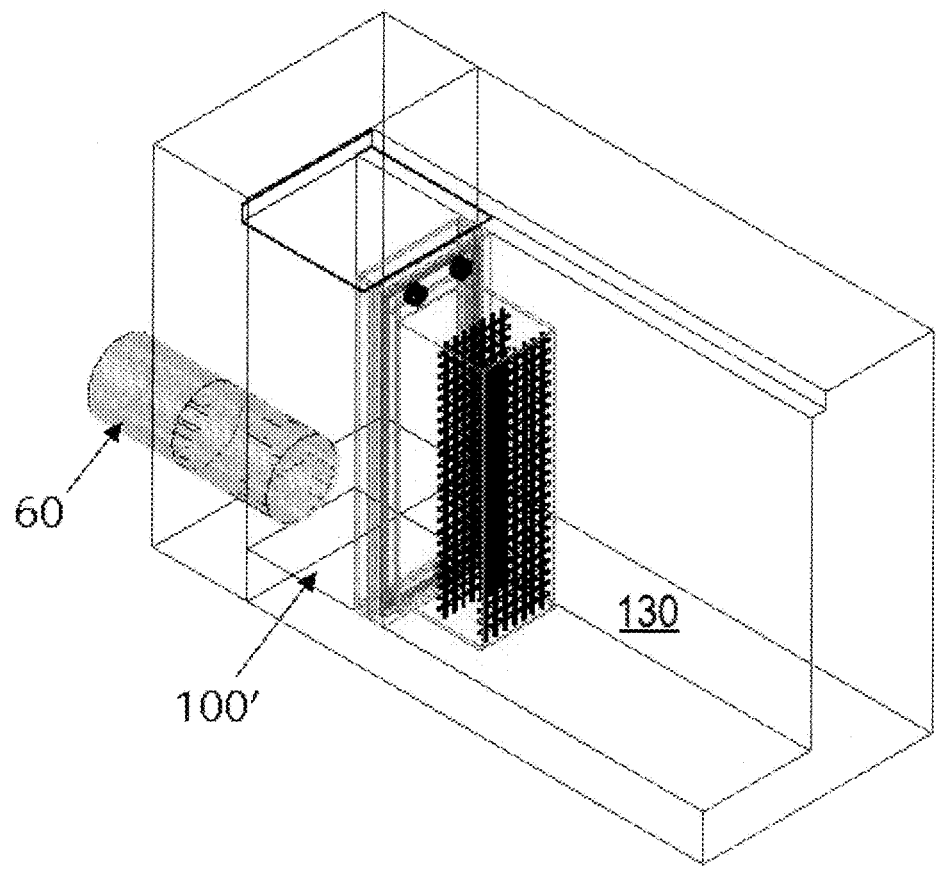
FIG. 7A is a perspective view of an embodiment of a trench filtration assembly of the present invention using a slide-in connection structure.
Figure 7B:
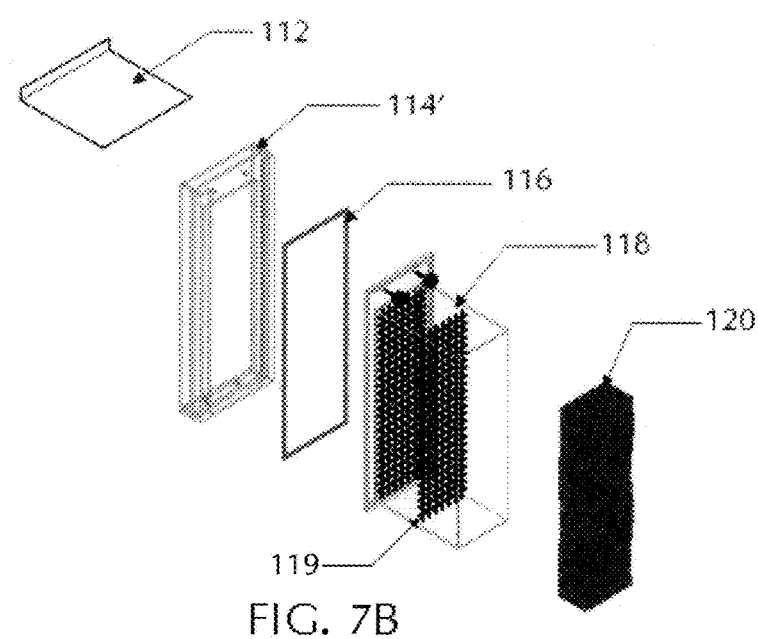
FIG. 7B is a perspective exploded view of the trench filtration assembly of FIG. 7A excluding the trench and housing.
Figure 7C:
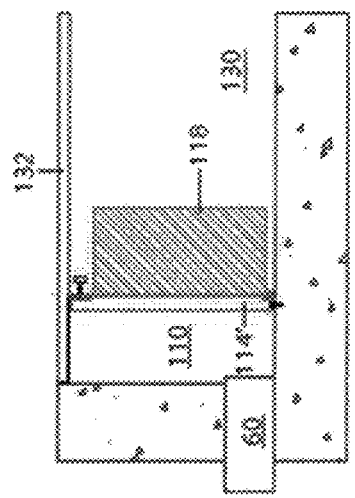
FIG. 7C is a side cross-sectional view of the trench filtration assembly of FIG. 7A.
Figure 7D:
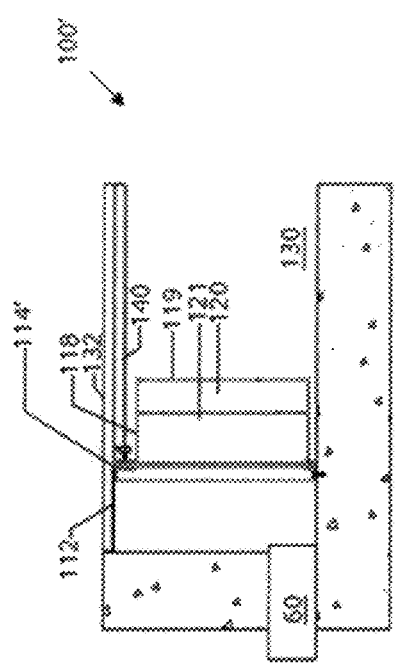
FIG. 7D is a side view of the trench filtration assembly of FIG. 7A showing the installation of the trench box into the housing.
Figure 7E:
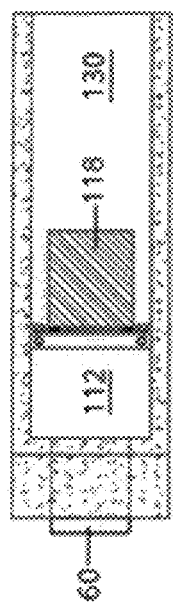
FIG. 7E is a top-down cross-sectional view of the trench filtration assembly of FIG. 7A.
Figure 7F:
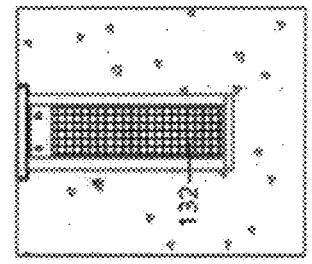
FIG. 7F is another side cross-sectional view of the trench filtration assembly of FIG. 7A.
Figure 7G:
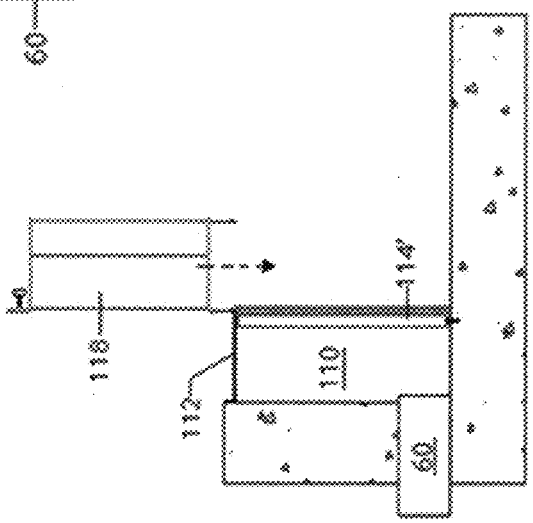
FIG. 7G is another top-down view of the trench filtration assembly of FIG. 7A showing the pre-filter grate disposed over the top of said trench filtration assembly.
Figure 8A:
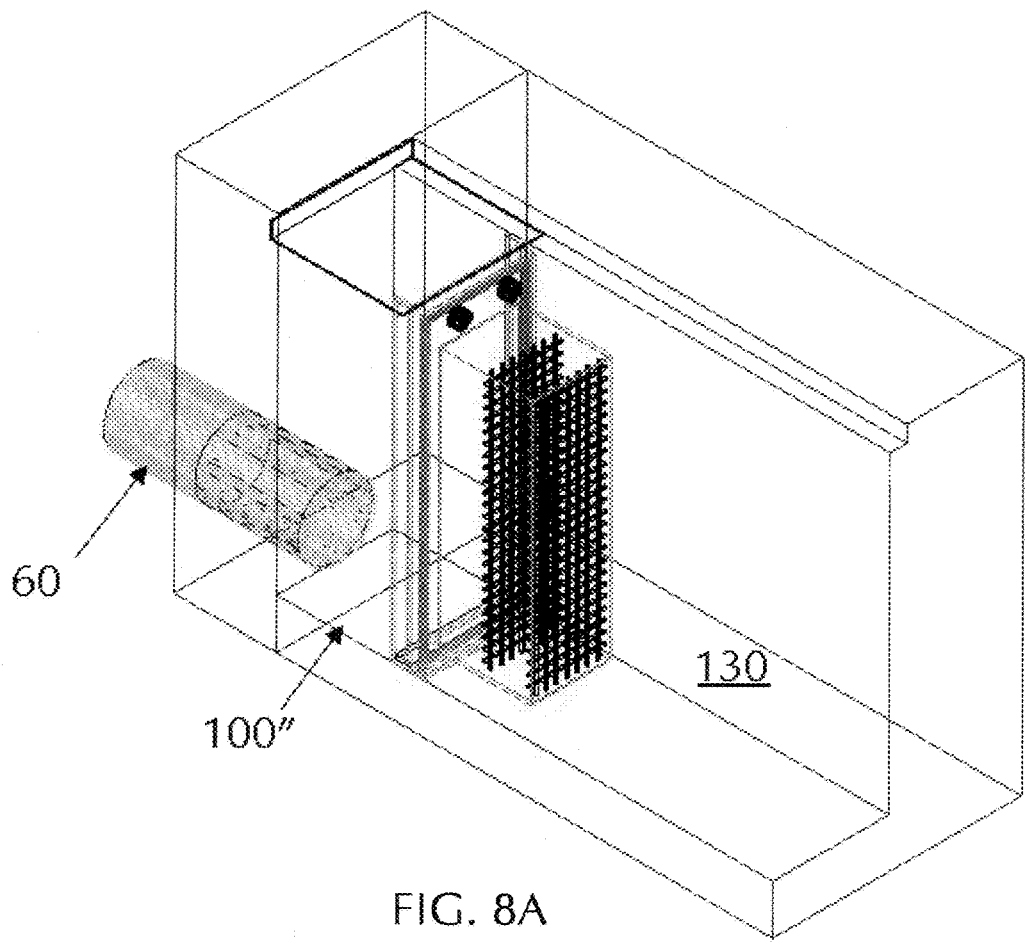
FIG. 8A is a perspective view of an embodiment of a trench filtration assembly of the present invention using a rotatable connection structure.
Figure 8B:
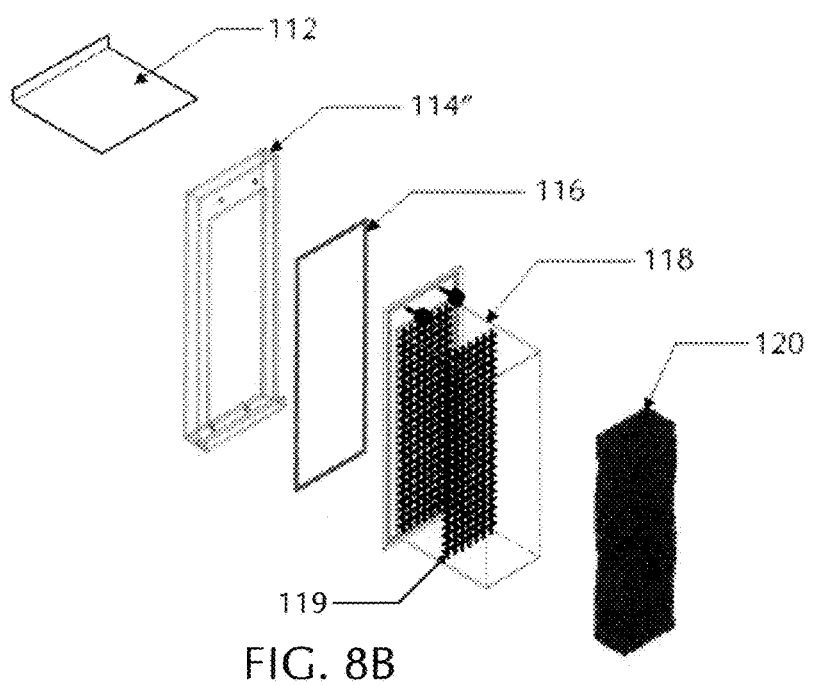
FIG. 8B is a perspective exploded view of the trench filtration assembly of FIG. 8A excluding the trench and housing.
Figure 8C:
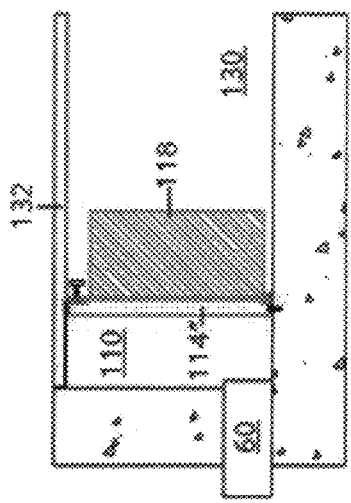
FIG. 8C is a side cross-sectional view of the trench filtration assembly of FIG. 8A.
Figure 8D:
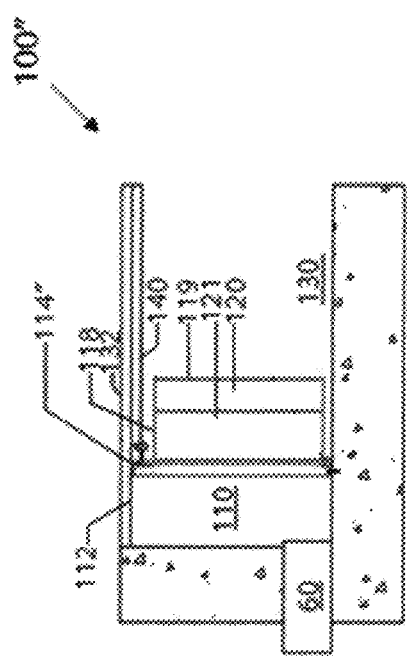
FIG. 8D is a side view of the trench filtration assembly of FIG. 8A showing the installation of the trench box into the housing.
Figure 8E:
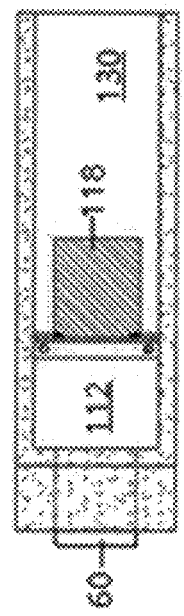
FIG. 8E is a top-down cross-sectional view of the trench filtration assembly of FIG. 8A.
Figure 8F:
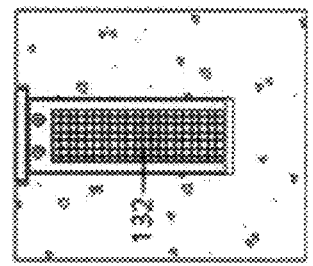
FIG. 8F is another side cross-sectional view of the trench filtration assembly of FIG. 8A.
Figure 8G:
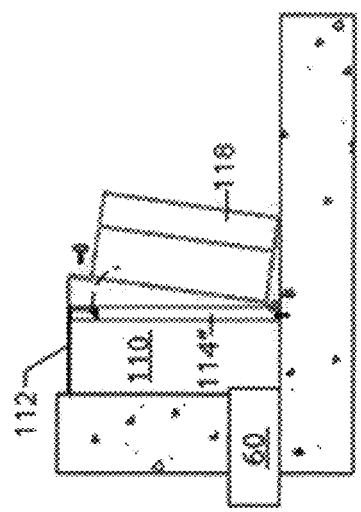
FIG. 8G is another top-down view of the trench filtration assembly of FIG. 8A showing the pre-filter grate disposed over the top of said trench filtration assembly.
Figure 9B:
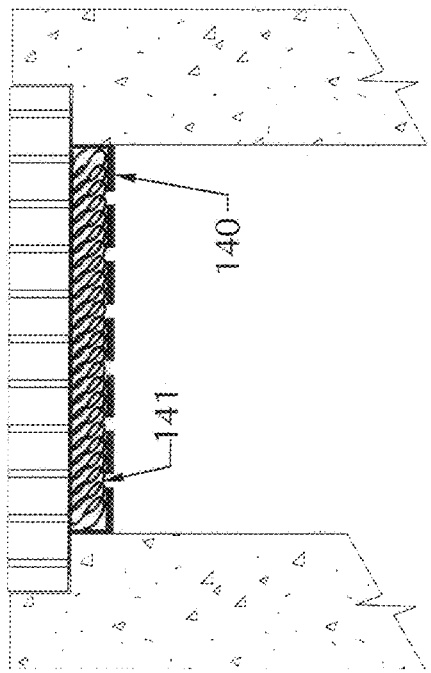
FIGS. 9A-9B present a pre-filter grate and associated pre-filter material that is installed in conjunction with the trench filtration assemblies of FIGS. 6A-8G.
Figure 9A:
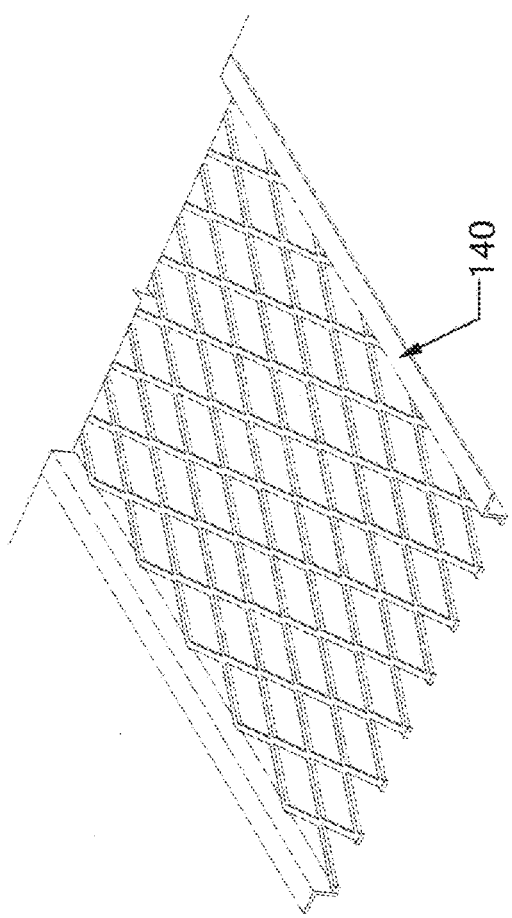

After the trench filtration assembly 100-100" is installed, a pre-filter grate 140 and associated pre-filter material 141 are installed above the trench box assembly, as demonstrated in FIGS. 9A-9B and further shown in each of FIGS. 6C, 7C, and 8C of the trench filtration assembly embodiments 100-100", respectively. Pre-filter grate 140 is disposed between the top of the trench box assembly and bottom of the trench grate 132, and prevents introduction of any rocks, dirt, or other debris that would otherwise enter from above the assembly and block the flow of fluid.

Figure 10:
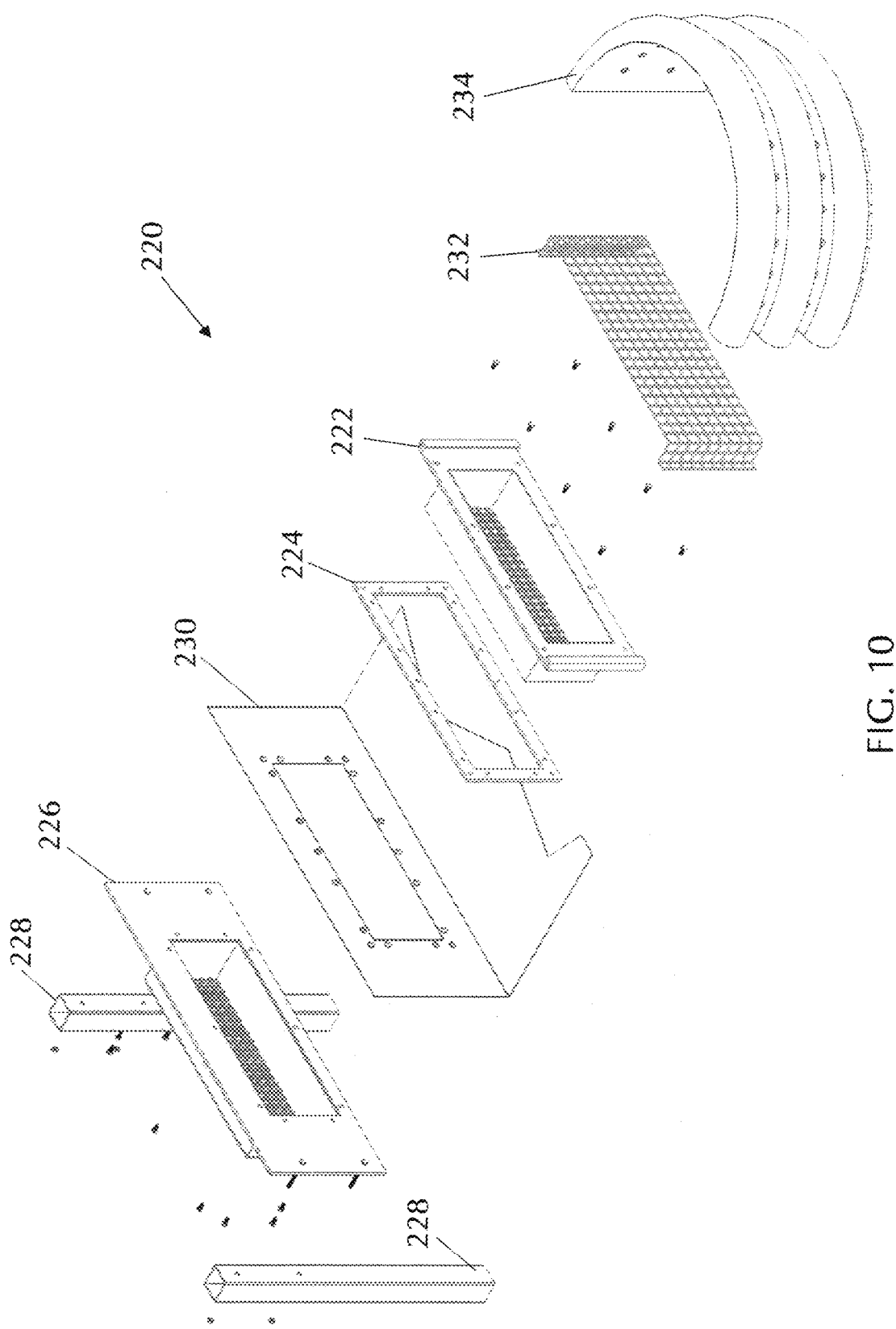
FIG. 10 is a perspective, exploded view of a liner box or liner filtration assembly for installation over an opening in a liner, the liner box or liner filtration assembly using a bolted connection structure.
Figure 11:
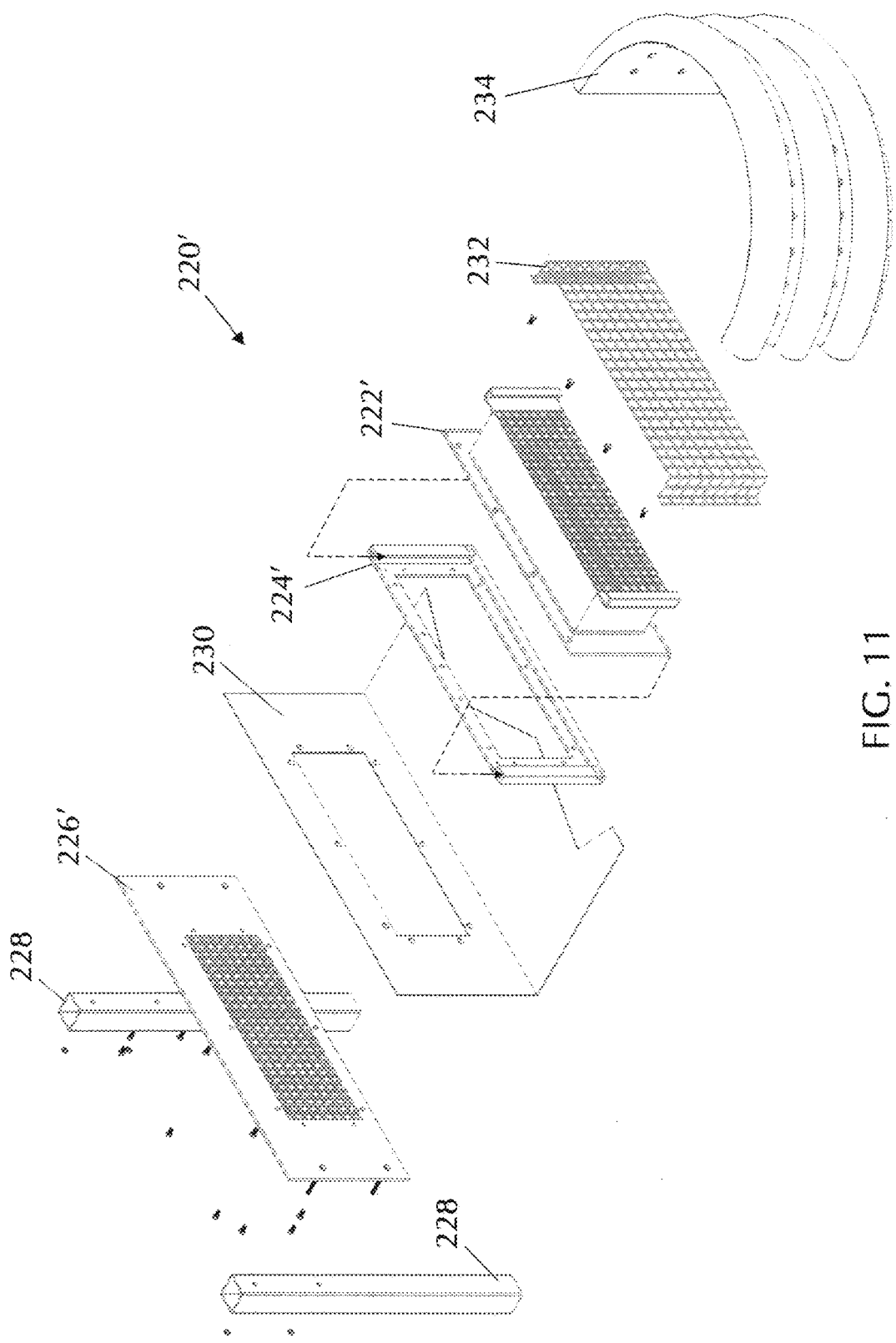
FIG. 11 is a perspective, exploded view of an embodiment of the liner box or liner filtration assembly of FIG. 10 using a slide-in connection structure.
Figure 12:
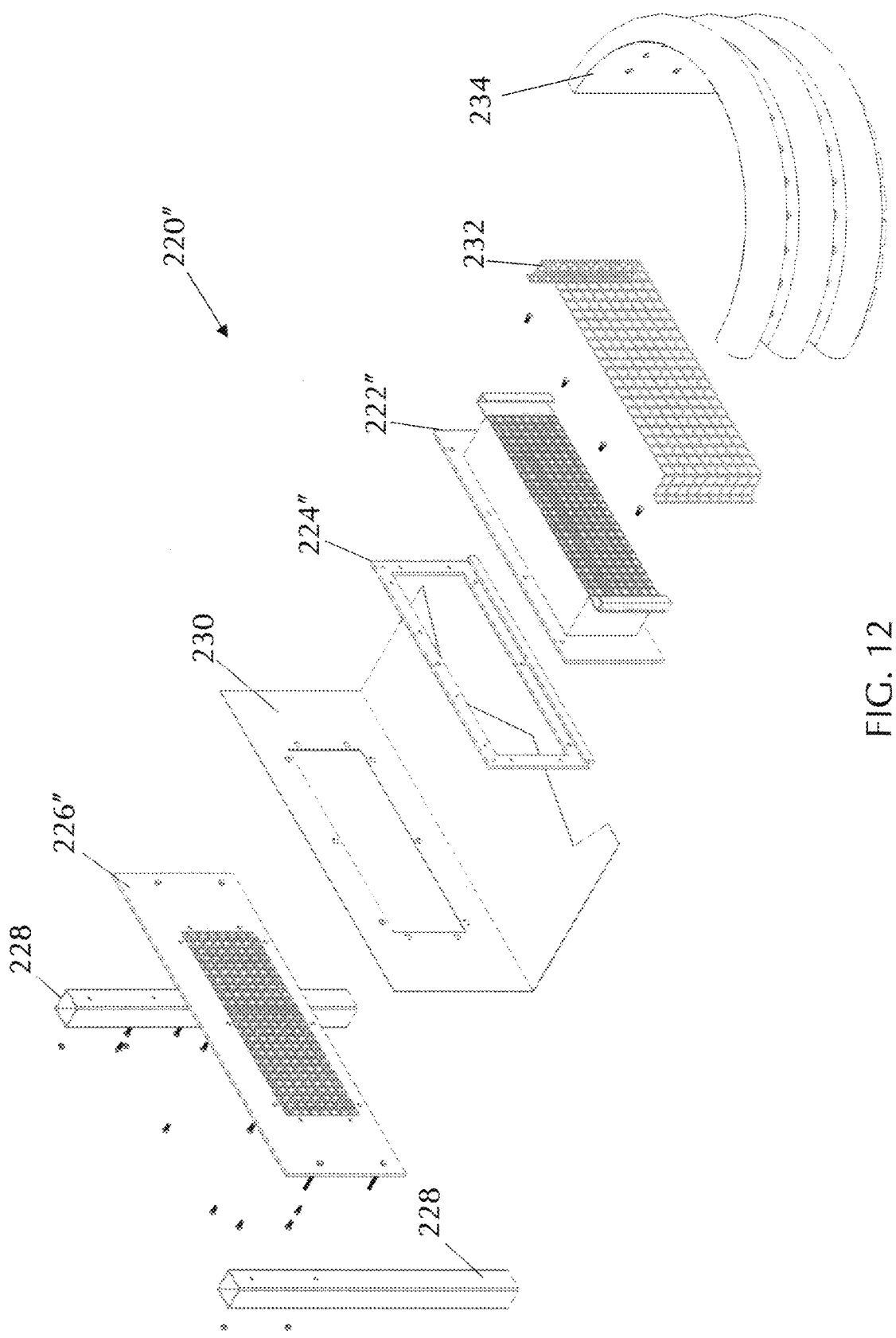
FIG. 12 is a perspective, exploded view of an embodiment of the liner box or liner filtration assembly of FIG. 10 using a rotatable connection structure.

Liner Pre-Filtration Assembly Embodiment:

In another embodiment of the present invention, as depicted in FIGS. 10-12, a non-permeable liner, berm, or curtain having a base and sidewalls is laid out around a power plant, truck stop, fueling station, or any other commercial location necessitating spill containment, to create a directed flow path for the flow of contaminated water/fluid. An opening is provided at some point along the liner or curtain sidewalls to allow for passage of fluid that first enters through a liner pre-filtration assembly 220-220".

The liner pre-filtration assembly 220-220" is installed over the opening in the liner, represented as containment liner material 230, inside the slots area of the liner. Each pre-filtration assembly 220-220" is comprised of the same variations of components: a grated/permeable liner box 222-222" for collecting and holding debris, a mounting bracket 224-224" for attaching the liner box to the assembly, a grated/permeable mounting box 226-226" acting as the rear wall of the assembly installed behind the liner wall 230, and posts 228 to receive and secure the mounting box 226-226" disposed behind the containment liner material 230. A pre-filter grating 232 is installed over the outer, front facing surface of the liner box 222-222". In all instances, the liner box 222-222" is connected to the assembly such that a fluid/oil-tight seal is formed on the box sides and bottom (at the floor) to prevent passage of such fluid/oil and other debris through the liner in a manner that circumvents the assembly 220-220".

Once the assembly 220-220" is fully installed, a gravel guard 234 formed in a crescent shape (or any other suitable bracket shape) is disposed in front of the installed assembly to provide further filtration and prevent blockage from rocks and debris swept up by the moving water/fluid. The gravel guard 234 is permeable in such a way that allows for fluid to pass through, but larger stone, dirt, and other debris cannot. The differences across each embodiment of the assembly 220-220" involve the means of connecting the liner box 222-222" to the mounting bracket 224-224", and the design of the mounting box 226-226". An advantage of installing the liner filtration assembly 220-220" is an increased flow rate through the assembly due to the increased area for allowable flow. The filtration assembly 220-220" may be up to two feet long and 12 inches high from the liner floor, but other dimensions of the assembly may be used depending on the particular needs and dimensions of the installation site.

In pre-filtration assembly 220 as shown in FIG. 10, the liner box 222 is formed with a recess having four sidewalls and a permeable base, protruding in the direction towards the rear of the assembly. Mounting box 226 is formed in a similar fashion, having a recess with four sidewalls and a permeable base also protruding towards the rear. Liner box 222 is bolted into the mounting bracket 224, the bolts which further extend through the liner material 230 and mounting box 226 to secure the aforementioned components together, all of which are bolted into the posts 228. Once the components are secured together as described above, the protruding recess of the liner box 222 will traverse through the bracket 224, liner material 230, and into the recess of mounting box 226. The remainder of the assembly is formed as generally described above.

In the pre-filtration assembly 220' as shown in FIG. 11, the liner box 222' is formed with a recess having four sidewalls and a permeable base, protruding in the direction towards the front of the assembly, and flanges extending from the edges of the sidewalls. Mounting box 226' is formed as one flat planar piece, with a permeable grate comprising its midsection. Liner box 222' is slideably received into the top of the mounting bracket 224' via slots extending along the side edges of the bracket that receive the liner box 222' flanges. Bolts are used to connect the liner box 222' and bracket 224' assembly to the mounting box 226', the bolts which further extend through the bracket, liner material 230, and mounting box 226' to secure the aforementioned components together, the resultant assembly which is then bolted into the posts 228. The remainder of the assembly is formed as generally described above.

In the pre-filtration assembly 220" as shown in FIG. 12, the liner box 222" is formed with a recess having four sidewalls and a permeable base, protruding in the direction towards the front of the assembly. Mounting box 226" is formed as one flat planar piece, with a permeable grate comprising its midsection. Liner box 222" is rotatably secured into the bottom edge of the mounting bracket 224", though liner box 222" may also be hinged to the mounting bracket's top edge instead. Bolts are used to connect the liner box 222" and bracket 224" assembly to the mounting box 226", the bolts which further extend through the bracket, liner material 230, and mounting box 226" to secure the aforementioned components together, the resultant assembly which is then bolted into posts 228. The remainder of the assembly is formed as generally described above.

Once the liner filtration assembly 220-220" is in place, a redirecting drainage pipe may be installed at the rear of the assembly 220-220" adjacent to the mounting box 226-226". In this manner, filtered fluid may be redirected to an outside sump, drainage pool, or the like, depending on the installer needs.

The present invention provides one or more of the following advantages: 1) a stormwater insert box or container for filtering oil sheen from high volumes of storm water introduced into a storm drain while preventing surface level puddling; 2) a stormwater insert box or container and shutoff valve assembly capable of allowing bypass flow once the volume entering the container exceeds a certain threshold; 3) an angled filter insert assembly for a filter media plug for filtering ester-based fluid spills at energy plants, and for easy drainage of the filtered water into a location outside of the plant; 4) a trench filtration assembly for a filter media plug for insertion into a water runoff trench for filtering oil, gas, and debris from a flow of water that allows for higher flow rates; and 5) a liner pre-filtration assembly for a filter media plug for installation within a non-permeable liner or curtain for filtration of oil, gas, and debris collected by water runoff that allows for higher flow rates.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A trench filtration assembly for installation within a trench, comprising:
    a housing having a top, a bottom, a front end, internal sidewalls, and a rear end, said housing forming a fluid-tight seal with respect to said trench when installed such that fluid passing through said trench filtration assembly is directed through said housing;
    a sleeve attached to, and in fluid communication with, said housing rear end and having a sleeve bottom surface in contact with a top surface of said housing bottom, said sleeve forming a pathway for fluid exiting said housing;
    a removable trench box attachable to said housing such that fluid entering said trench is directed to, and passes through, said trench box;
    a filter media plug for filtering oil and other contaminants from a fluid, said filter media plug installed within said sleeve, such that fluid may only exit said trench through said filter media plug, said filter media plug including ester-based fluid absorption/adsorption filter media;
    a mounting bracket for securing said trench box to said housing front end;
    a removable grate disposed within said trench box for preventing passage of rocks and debris through the housing;

a trench filtration assembly pre-filter grate above said housing top and including a prefilter material interposing said pre-filter grate and said housing top; and a gasket disposed between the mounting bracket and trench box for maintaining a fluid-tight seal between said trench box and said housing;

said trench filtration assembly adapted for installation within a trench such that said trench filtration assembly housing is at least partially within said trench.

2. The trench filtration assembly of claim 1, wherein at least one of said internal sidewalls of the housing is shaped to allow for fluid to flow in the direction towards said sleeve and filter media plug.

3. The trench filtration assembly of claim 1 including a top panel in slideable communication with said top of said housing.

4. The trench filtration assembly of claim 1 wherein said sleeve directs filtered fluid into a collective container or sump.

5. The trench filtration assembly of claim 3 wherein said sleeve is positioned for receiving the filter media plug at an angle with respect to said top panel.

6. The trench filtration assembly of claim 1, wherein said housing or said sleeve may be installed underneath a liner or flush with a floor surface.

7. The trench filtration assembly of claim 1 wherein upon securing of said trench box to said mounting bracket, a body of said trench box is disposed inside of said housing.

8. The trench filtration assembly of claim 1 wherein the trench box is rotatably connected to the mounting bracket to allow the trench box to rotate away from the housing.

9. The trench filtration assembly of claim 1 wherein securing of said trench box to said mounting bracket, a body of said trench box is disposed outside of said housing.

10. The trench filtration assembly of claim 1 wherein said trench box has flanges extending from side edges, and said mounting bracket secures said trench box to the housing via slots disposed on either side of said mounting bracket, said slots receiving said trench box flanges.

11. The trench filtration assembly of claim 1 including pre-filter media installed within said housing upstream of said filter media plug.

* * * * *